United States Patent
Patton et al.

(10) Patent No.: US 10,795,380 B1
(45) Date of Patent: *Oct. 6, 2020

(54) SYSTEM AND METHOD FOR EVENT-BASED VEHICLE OPERATION

(71) Applicant: Banjo, Inc., South Jordan, UT (US)

(72) Inventors: Damien Michael Patton, Park City, UT (US); Rish Mehta, Redwood City, CA (US)

(73) Assignee: safeXai, Inc., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,830

(22) Filed: Jan. 27, 2020

(51) Int. Cl.
| | | |
|---|---|---|
| *B64C 39/02* | (2006.01) | |
| *G05D 1/10* | (2006.01) | |
| *G08G 5/00* | (2006.01) | |
| *G06Q 50/00* | (2012.01) | |

(52) U.S. Cl.
CPC .......... *G05D 1/106* (2019.05); *B64C 39/024* (2013.01); *G06Q 50/01* (2013.01); *G08G 5/0008* (2013.01); *G08G 5/0039* (2013.01); *B64C 2201/12* (2013.01)

(58) Field of Classification Search
CPC .... B64C 39/024; B64C 2201/12; G05D 1/06; G06Q 50/01; G08G 5/0008; G08G 5/0039
See application file for complete search history.

(56) References Cited

U.S. PATENT DOCUMENTS

| | | | |
|---|---|---|---|
| 10,586,024 B1* | 3/2020 | Patton et al. | |
| 2014/0320655 A1* | 10/2014 | Kim | G07C 5/0866 348/148 |
| 2016/0109250 A1* | 4/2016 | Baughman | G01C 21/3415 701/515 |
| 2019/0086227 A1* | 3/2019 | Laaksonen | H04W 4/021 |
| 2019/0302766 A1* | 10/2019 | Mondello | G06N 3/02 |

FOREIGN PATENT DOCUMENTS

JP        2007280407 A   * 10/2007

* cited by examiner

*Primary Examiner* — Robert T Nguyen

(74) *Attorney, Agent, or Firm* — Dodd Law Group, LLC; Michael B. Dodd

(57) ABSTRACT

Embodiments of a method and/or system for facilitating event-based vehicle operation can include routing a vehicle along a route in a three-dimensional space; detecting an event based on the external signal; determining that the event is of interest based on a parameter associated with the vehicle; and re-routing the vehicle towards the event, including modifying a vehicle locomotion component to move the vehicle toward the event along a shortened route.

18 Claims, 16 Drawing Sheets notifications vehicle description (e.g., vehicle location)

first notification for first vehicle second notification for second vehicle

FIGURE 22

SYSTEM AND METHOD FOR EVENT-BASED VEHICLE OPERATION

CROSS-REFERENCE TO RELATED APPLICATIONS

This application is a continuation of U.S. application Ser. No. 16/575,046 filed 18 Sep. 2019. That application is a continuation of U.S. application Ser. No. 16/420,414, filed 23 May 2019. That application is a continuation of U.S. application Ser. No. 15/985,491 filed 21 May 2018, which is a continuation-in-part of U.S. application Ser. No. 15/902,935 filed 22 Feb. 2018, which is a continuation of U.S. application Ser. No. 15/250,735, filed 29 Aug. 2016, which is a continuation-in-part of U.S. application Ser. No. 14/882,318 filed 13 Oct. 2015, which claims the priority of U.S. Provisional Application No. 62/063,078 filed 13 Oct. 2014 and is a continuation-in-part of U.S. application Ser. No. 14/643,958 filed 10 Mar. 2015. application Ser. No. 14/643,958 is a continuation-in-part of U.S. application Ser. No. 14/574,966, filed 18 Dec. 2014, which claims the benefit of U.S. Provisional Application No. 61/918,126, filed 19 Dec. 2013, U.S. Provisional Application No. 62/060,407, filed 6 Oct. 2014, and U.S. Provisional Application No. 62/006,632, filed 2 Jun. 2014. application Ser. No. 14/643,958 is also a continuation-in-part of application Ser. No. 14/501,436 filed 30 Sep. 2014, which is a continuation-in-part of application Ser. No. 14/043,479, filed 1 Oct. 2013, which claims the benefit of U.S. Provisional Application No. 61/709,103, filed 2 Oct. 2012, U.S. Provisional Application No. 61/782,687, filed 14 Mar. 2013, and U.S. Provisional Application No. 61/784,809, filed 14 Mar. 2013. application Ser. No. 14/501,436 also claims the benefit of U.S. Provisional Application No. 61/885,322, filed 1 Oct. 2013, U.S. Provisional Application No. 61/918,126, filed 19 Dec. 2013, and U.S. Provisional Application No. 62/006,632, filed 2 Jun. 2014.

U.S. application Ser. No. 15/985,491 additionally claims the benefit of U.S. Provisional Application No. 62/508,888 filed 19 May 2017.

All of the aforementioned applications are incorporated herein in their entireties by this reference.

TECHNICAL FIELD

This invention relates generally to the vehicle routing field, and more specifically to a new and useful system and method in the vehicle routing field.

BRIEF DESCRIPTION OF THE FIGURES

FIG. 22 is a schematic representation of a second example of presenting event notifications.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
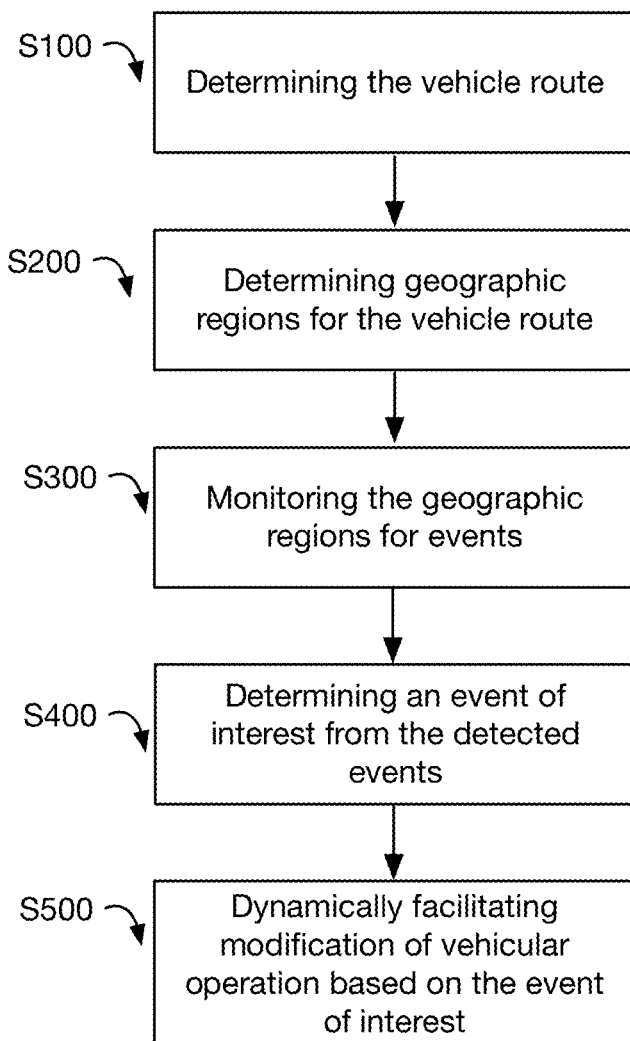
FIGS. 1A-1B are schematic representations of embodiments of the method.
Figure 1B:
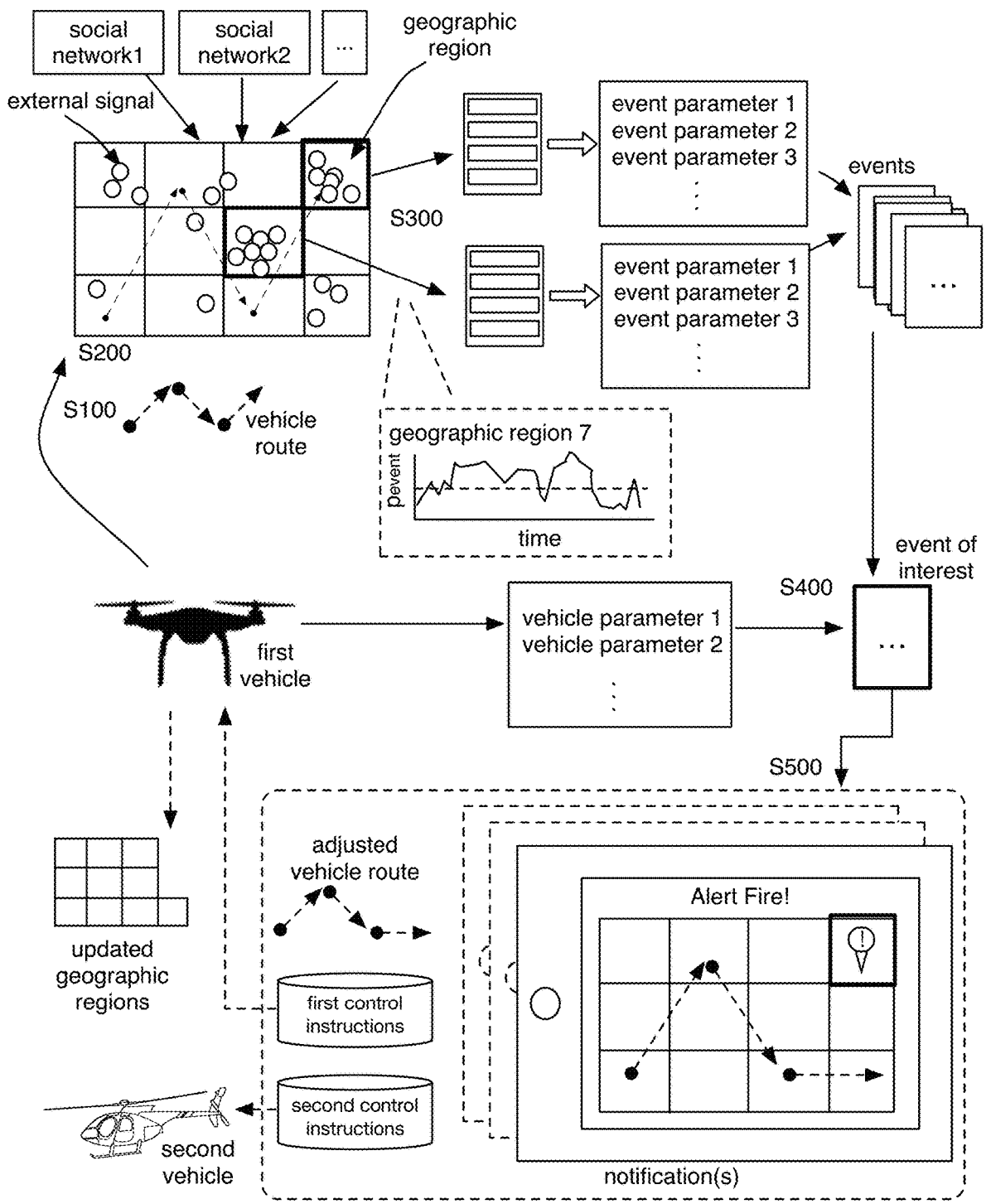

As shown in FIGS. 1A-1B, an embodiment of a method 100 for facilitating event-based vehicle operation (e.g., facilitating improved event-based vehicle routing for a vehicle or set of vehicles, etc.) can include: determining a vehicle route S100; determining geographic regions for the vehicle route S200; monitoring the determined geographic regions for events S300; determining an event of interest from the detected events S400; and/or dynamically facilitating modification of vehicular operation of the vehicle based on the event of interest S500 (e.g., controlling vehicle operation to travel along an adjusted vehicle route; determining and presenting a notification for the vehicle and/or vehicle entity; etc.), such as in response to event detection within the identified geographic region. Embodiments of the method 100 and/or system 200 can function to facilitate real- or near-real time path planning for vehicles and/or vehicle entities. Path planning, other means of dynamically facilitating vehicular operation modification, event detection, and/or other suitable portions of the method 100 and/or system 200 can be performed in real- or near real-time, where real- or near real-time can include any one or more of: concurrently with collecting external signals (e.g., detecting an event and/or facilitating vehicular operation modification based on an event as signals corresponding to the event are collected; etc.); live in relation to an event (e.g., as an event is occurring, or before an event, etc.), external signal for an event, vehicular operation (e.g., during vehicular travel on a vehicle route; prior to arrival at a geographic location proximal the event; etc.), and/or other suitable component; satisfying a threshold time period (e.g., from the initiation of an event; from the first collected external signal for an event; etc.), and/or other suitable variants.

In a first example, the method 100 can include, at a processing system (e.g., remote from a set of vehicles; including processors of the set of vehicles; first party processing systems; third party processing systems; user processing systems; etc.): determining vehicle routes for the set of vehicles (e.g., based on selections of waypoints received by a vehicle entity at a vehicle entity interface, etc.); determining a set of geographic regions for the set of vehicles based on the vehicle routes (e.g., determining geographic regions that include the vehicle routes, the geographic regions to be monitored for events relevant to the set of vehicles; etc.); collecting external signals for the set of geographic regions (e.g., collecting signals from sources on the Internet, such as social networking sources, etc.); detecting a set of events associated with the set of geographic regions based on the external signals (e.g., detecting an event in response to Internet-based signals satisfying a threshold condition); for each vehicle of the set of vehicles: filtering the set of events for an event of interest for the vehicle based on a vehicle parameter associated with the vehicle (e.g., identifying events likely to affect a vehicle of the set of vehicles if traveling along the corresponding vehicle route; etc.); and dynamically facilitating modification of vehicular operation of the vehicle (e.g., to travel along an adjusted vehicle route distinct from the vehicle route corresponding to the vehicle, etc.), based on the event of interest for the vehicle (e.g., determining and providing an adjusted vehicle route that avoids the one or more geographic regions corresponding to the event of interest, etc.).

In a second example, the method 100 can include, determining a set of geographic regions based on a vehicle route for the vehicle; at a processing system (e.g., remote from the vehicle), during a time period of vehicular operation of the vehicle (e.g., along the vehicle route, during vehicle deployment preparation prior to travel along the vehicle route, during charging, etc.): collecting external signals for the set of geographic regions; detecting a set of events associated with the set of geographic regions based on the external signals; determining event parameters for the set of events, the event parameters describing the event (e.g., event category, event content, associated confidence levels, etc.); determining an event of interest from the set of events based on the event parameters (e.g., an event category matching an event category condition associated with a vehicle class of a vehicle); and dynamically facilitating modification of vehicular operation of the vehicle (e.g., to travel along an adjusted vehicle route distinct from the vehicle route corresponding to the vehicle, etc.), based on the event of interest.

All or part of the method 100 can be performed by any combination of components of the system 200 described herein, a set of remote processing systems, vehicles, and/or any other suitable system components.

2. Benefits

The inventors have discovered that there is at least a need for vehicles to be dynamically routed based on event locations. For example, vehicles may wish to avoid event locations that could have adverse effects on vehicle operation (e.g., UAVs may wish to avoid areas with fire, to avoid heat damage or smoke screening; terrestrial vehicles may wish to avoid areas with roadblocks; vehicles may wish to avoid locations associated with natural disasters; etc.), and treat event locations as dynamic no-fly zones. In another example, vehicles may wish to encounter event locations (e.g., news helicopters may wish to travel close to as many events as possible to maximize the value of scrambling the vehicle; vehicle entities controlling drones may wish to capture events of interests with on-board optical sensors; etc.), where the event locations can be treated as dynamic waypoints.

A difficulty with this dynamic routing, however, is that events can occur spontaneously. The nature of such events can make route prediction and planning a challenge, since an adverse event can occur along the vehicle route while the vehicle is already en route (e.g., weather-related adverse events, traffic-related adverse events, etc.). Furthermore, events can be difficult to predict, and can be difficult to detect with sufficient speed, certainty, and/or fidelity to be actionable by a vehicle (and/or associated vehicle entity such as a pilot of the vehicle etc.). For example, a drone operator (e.g., UAV operator) needs to know, in near-real time, that a fire just occurred in the drone's immediate flight path, just outside of the drone's sensing range. Moreover, events can be transient—an event in the vehicle route that is currently on-going may have ended by the time the vehicle arrives at the event location (e.g., such that re-routing of the vehicle is unnecessary).

Additionally, because the vehicle is a moving asset that can be sensitive to not only events in the immediate route but also to events in surrounding areas, detecting events associated with the vehicle can require the system 200 to monitor a large number of different spaces, each of which can be relevant at different times. Furthermore, the identity and/or number of monitored spaces can change over time (e.g., due to expected or unexpected route or vehicle operation changes). This can require a substantial amount of processing power and memory for just a single vehicle; when embodiments of the method 100 and/or system 200 are applied to multiple vehicles (e.g., within a fleet or across multiple entities), the processing power increases drastically, and the processing speed drops accordingly. These computing challenges can be further compounded because different vehicles and/or vehicle entities can be interested in different events (e.g., depending on vehicle class, vehicle entity preferences, etc.); in examples, each vehicle's event filter is dynamically reassigned to the geographic regions corresponding to the current vehicle's location whenever the vehicle moves, in order to account for vehicle travel and the different events of interest across vehicles, vehicle entities, and/or other parameters.

Thus, there is a need in the vehicle routing field to create a new and useful system 200 and method 100, such as for event-based vehicle routing. This invention provides such new and useful system 200 and method 100.

First, embodiments of the system 200 and method 100 can detect past, present, and/or future events with high fidelity and confidence in real- or near-real time (e.g., based on social networking system posts, emergency systems notifications, en-route vehicles' sensor streams, etc.), and can dynamically facilitate modification of vehicular operation (e.g., through vehicle re-routing, providing relevant route-related and/or event-related notifications to the vehicle and/or vehicle entity), such as in real- or near-real time. As such, the technology can improve the technical fields of at least vehicle routing, fleet management, event detection and/or characterization, and/or any other relevant fields. Embodiments of the method 100 and/or system 200 can additionally or alternatively: automatically determine a new route for the vehicle (e.g., to avoid events or treat events as waypoints), monitor raw signals (e.g., social networking system posts) for content about the vehicle (e.g., allowing the vehicle entity to gauge public response to the vehicle), provide information about the event in real time, near-real time, or asynchronously to the vehicle entity or operator, and/or perform any other suitable functionality.

Second, embodiments of the method 100 and/or system 200 can additionally or alternatively transform entities into different states or things. For example, embodiments can facilitate dynamic modification of aspects of vehicular operation, including at least one of: movement (e.g., facilitating re-routing of the vehicle to avoid or attend events of interest; etc.), durability (e.g., by routing the vehicle to avoid events that may adversely affect the vehicle; etc.), data collection (e.g., facilitating control sensor data sampling to collect data facilitating analysis by the event detection system, event monitoring system, and/or other suitable components; etc.), battery life (e.g., through route optimization, etc.), and/or any other suitable vehicular operation aspects. As such, embodiments can leverage system component outputs (e.g., detected events, event parameters, notifications, etc.) to facilitate physical actions performed by a vehicle and/or other suitable system component.

Third, embodiments of the method 100 and/or system 200 can additionally or alternatively confer improvements in the functioning of a processing system (e.g., computing system, remote processing system, vehicle processing system, etc.) itself. In variations, the system 200 and method 100 can aggregate the geographic regions (e.g., geographic regions) across multiple vehicles (e.g., within the same or different fleets) into a single, larger, aggregate region (e.g., aggregate geographic region), thereby reducing the amount of processing power and/or memory required to constantly monitor the vehicle routes and/or identify relevant events (e.g., enabling the system 200 to scale with the number of inputs, vehicles, and/or other parameter; by reducing redundant computing processes; etc.). Additionally or alternatively, any portions of the method 100 can be adapted to a plurality of vehicles for improving computational efficiency of associated processing systems.

Fourth, the technology can provide technical solutions necessarily rooted in computer technology (e.g., leveraging Internet-based sources for external signals informing event detection and/or characterization such as for identifying events of interest to particular vehicles; generating and/or applying computational modules such as event filter modules for delivering vehicle-specific and/or vehicle entity-specific content to a plurality of vehicles and/or vehicle entities, etc.) such as to overcome issues specifically arising with computer technology (e.g., achieving centralized, remote, event-based management of a fleet of vehicles; achieving dynamic real-time or near real-time event-based routing for vehicles; etc.).

Fifth, the technology can amount to an inventive distribution of functionality across a network including a remote processing system, vehicles, vehicle entities, and/or other suitable components. In an example, embodiments of the method 100 can be performed in a centralized manner by a remote processing system (e.g., including a deployment system, event detection system, event monitoring system, other system components, etc.), in order to enable improved event-based fleet management of a plurality of vehicles such as through communicating relevant information (e.g., event-related information, route-related information) to vehicles and/or vehicle entities.

However, in specific examples, the technology can provide any other suitable improvements, such as in the context of using non-generalized processing systems and/or other suitable components, through performing suitable portions of the method 100 and/or applying suitable components of the system 200.

3. System

Figure 2:
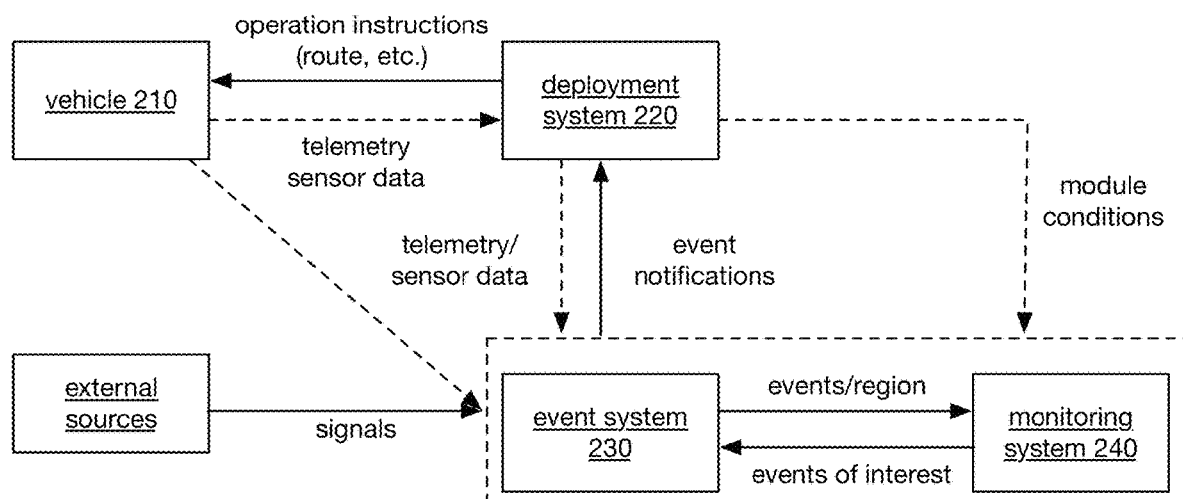
FIG. 2 is a schematic representation of an embodiment of the system.

As shown in FIG. 2, embodiments of a system 200 (e.g., a vehicle operation system) for facilitating improved event-based vehicle operation can include: a vehicle 210, a deployment system 220 (e.g., a vehicle deployment system), an event system 230 (e.g., an event detection system), and/or a monitoring system 240 (e.g., event monitoring system).

The system 200 and/or portions of the system 200 can entirely or partially be executed by, hosted on, communicate with, and/or otherwise include: a remote processing system (e.g., a server, at least one networked processing system, stateless, stateful; etc.), a local processing system, vehicles 210, an original equipment manufacturer (OEM) system (e.g., an OEM platform hosted by a OEM server, etc.), social network systems, a user device (e.g., a vehicle entity device, mobile phone device, other mobile device, personal computing device, tablet, wearable, head-mounted wearable computing device, wrist-mounted wearable computing device, etc.), databases (e.g., for storing any suitable data and/or data types described herein, such as with associations between any suitable data and/or data types described herein, etc.), application programming interfaces (APIs) (e.g., for accessing data described herein, etc.) and/or any suitable component. Communication by and/or between any components of the system 200 can include wireless communication (e.g., WiFi, Bluetooth, radiofrequency, Zigbee, Z-wave, etc.), wired communication, and/or any other suitable types of communication.

The components of the system 200 can be physically and/or logically integrated in any manner (e.g., with any suitable distributions of functionality across the components, such as in relation to portions of the method 100; where a remote processing system includes the deployment system, event system, and/or monitoring system; etc.). Additionally or alternatively, components of the system 200 can be integrated with any suitable existing components (e.g., third party APIs, platforms, systems, vehicles, vehicle interfaces, etc.).

Additionally or alternatively, components of the system 200 can include any suitable components described in and/or be configured in any suitable manner described in U.S. application Ser. Nos. 14/643,958 and 15/250,735, which are each incorporated in their entireties by this reference. However, the system 200 can include any other suitable subsystem or combination thereof, and components of the system 200 can be configured in any suitable manner.

The vehicle 210 can function to physically traverse along a vehicle route. Additionally or alternatively, the vehicle 210 can function to sample vehicle sensor data, communicate with other system components (e.g., a remote processing system, etc.), execute control instructions, and/or perform other suitable processes. The vehicle 210 can be an aerial vehicle (e.g., drone, airplane, helicopter), terrestrial vehicle (car, truck, autonomous vehicle), aquatic vehicle (e.g., ship, submarine, etc.), and/or any other suitable vehicle. The vehicle 210 can be manned, unmanned (e.g., remote controlled, automatic, semi-automatic, etc.), and/or otherwise controlled. The vehicle is preferably part of fleet and/or associated with vehicle entity (e.g., the fleet manager, vehicle operator, etc.), but can be otherwise associated with any other suitable set of secondary vehicles. The vehicle 210 can include locomotion mechanisms (e.g., rotors, motor, etc.), communication mechanisms (e.g., WiFi, BLE, cellular, etc.), vehicle sensors (e.g., on-board sensors, etc.), processing systems (e.g., CPU, GPU), and/or any other suitable component. Vehicle sensors can include any one or more of: optical sensors (e.g., cameras; in-vehicle cameras; exterior cameras; dashboard cameras; infrared cameras; 3D stereo cameras; monocular camera front-view cameras; side-view cameras; etc.), proximity sensors (e.g., radar, electromagnetic sensor, ultrasonic sensor, light detection and ranging, light amplification for detection and ranging, line laser scanner, laser detection and ranging, airborne laser swath mapping, laser altimetry, sonar, etc.), movement sensors (e.g., position, velocity, and/or acceleration sensors; accelerometers; gyroscopes; etc.), location sensors (e.g., GPS sensors, compass data, etc.), odometer, altimeter, environmental sensors (e.g., pressure, temperature, etc.), light sensors (e.g., infrared sensors, ambient light sensors, etc.), fuel sensors (e.g., percentile-based, distance-based, etc.), oxygen sensors, throttle position, gear sensor (e.g., drive, neutral, park, reverse, gear number, etc.), HVAC sensors (e.g., current temperature, target temperature, etc.), internal monitoring sensors (e.g., battery monitoring systems, voltage sensors, etc.), and/or any other vehicle sensors.

Vehicular operation corresponding with one or more vehicles 210 can be associated with any one or more of: movement (e.g., along a vehicle route; movement in relation to geographic regions, event locations, other locations; location of the vehicle 210; etc.), durability (e.g., lifespan, vehicle component status, maintenance-related statuses, vehicle damager characteristics such as damage location, mechanical damage characteristics, electrical damage characteristics, etc.), data collection (e.g., by vehicle sensors), battery (e.g., battery life, efficiency, etc.), processing (e.g., by a vehicle processing system; processing of control instructions; responding to communications from components of the system; etc.), vehicle interaction (e.g., vehicle interaction regions, etc.), and/or any other suitable aspects of vehicular operation.

Vehicle parameters preferably describe a vehicle 210 and/or associated vehicular operation. Vehicle parameters can include any one or more of: vehicle identifiers, vehicle class (e.g., vehicle type; aerial; terrestrial; aquatic; make; model; age; engine type; battery type; brakes type; fuel type; associated sensor types; position, velocity, and/or acceleration parameters; size parameters such as dimension parameters and/or weight parameters; etc.), vehicle operation parameters, locomotor mechanism parameters, vehicle sensor data, emissions parameters, and/or any other suitable parameters. Vehicle parameters can be user determined, automatically determined (e.g., by a system component), customer-determined, and/or otherwise determined at any suitable time and frequency (e.g., for storage in a database of the system). Vehicle sensor data sampled and/or otherwise collected by vehicles 210, and/or other suitable vehicle parameters can be used by any suitable system component for identifying events of interest (e.g., based on analyzing vehicle sensor data in combination with analyzing event parameters; etc.), detecting events, generating notifications, and/or performing any other suitable portion of the method 100.

Figure 17:
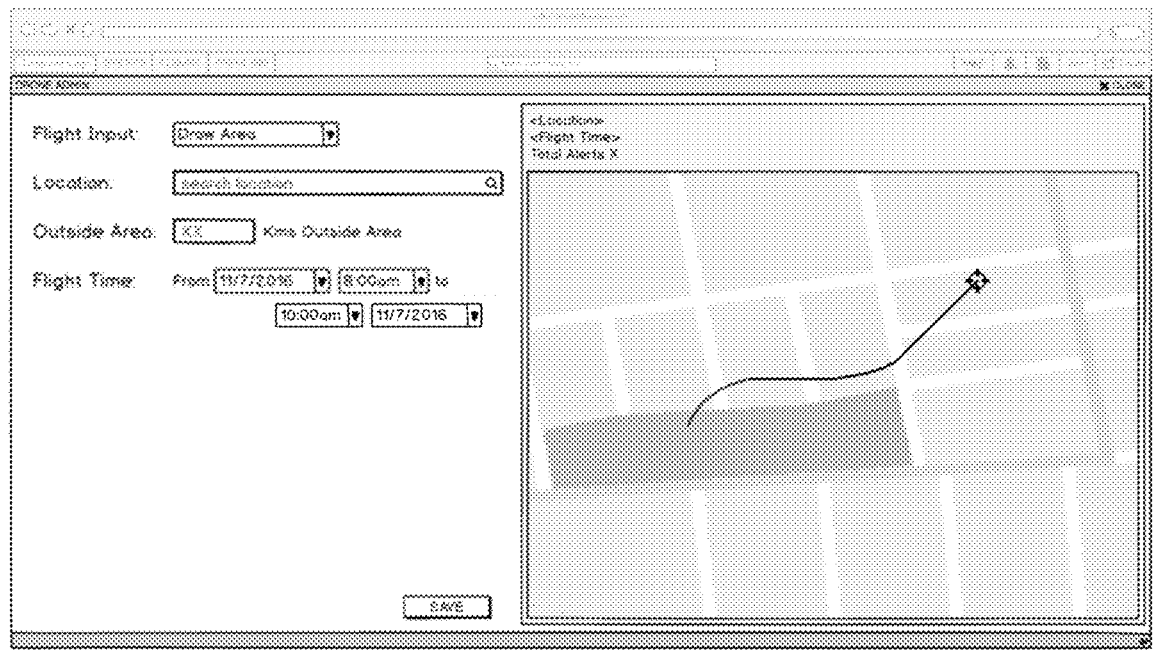
FIG. 17 is a schematic representation of an example of receiving a vehicle route.
Figure 18:
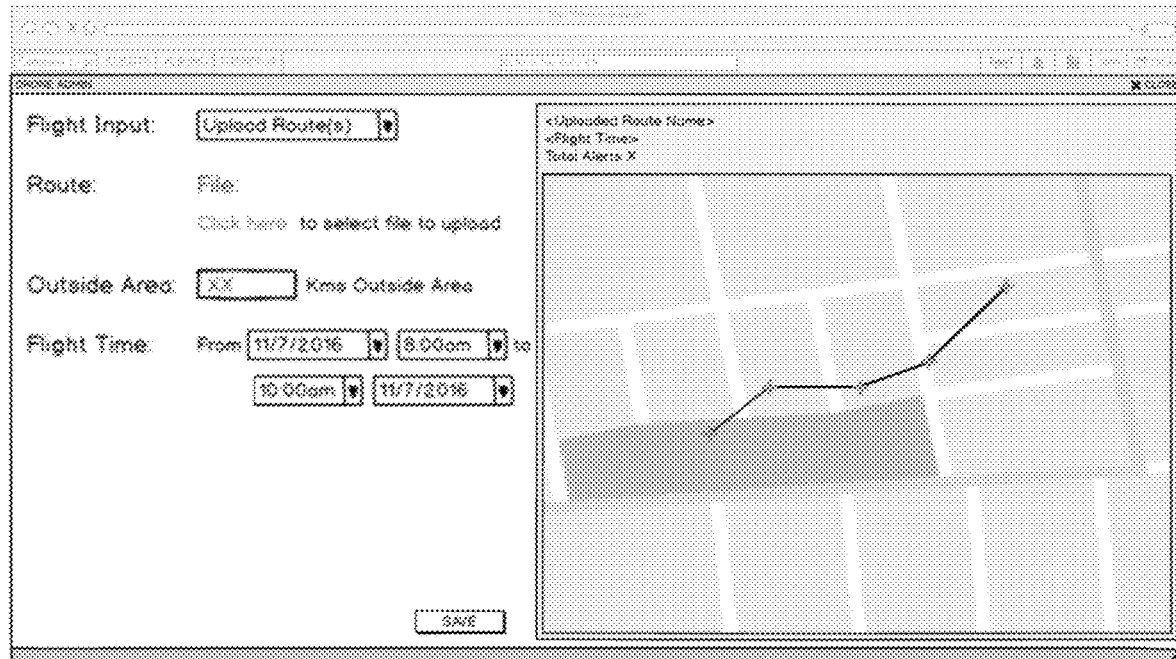
FIG. 18 is a schematic representation of an example of receiving a set of waypoints and automatically determining the vehicle route based on the waypoints.

The vehicle route can be pre-determined (e.g., before vehicle deployment, before vehicle movement, etc.), dynamically determined (e.g., while the vehicle 210 is en route; during vehicle operation; etc.), and/or otherwise determined (e.g., a first vehicle route pre-determined prior to vehicle deployment, a second vehicle route updated from the first vehicle route during vehicular operation of travel along the first vehicle route; etc.). All or a portion (e.g., the next 10 minutes) of the overall vehicle route (e.g., from deployment to return) and/or segments of the vehicle route can be determined each time the route is determined, and/or determined at any suitable frequency and time. The vehicle route can be determined by a user (e.g., entered by a vehicle entity at a vehicle entity interface, as shown in FIGS. 17-18), automatically determined (e.g., by the deployment system 220, event system 230, monitoring system 240, remote processing system, etc.), vehicle 210 (e.g., communicated to a remote processing system by self-controlled vehicles to facilitate event-based route modifications, which can be communicated back to the self-controlled vehicles, etc.), and/or otherwise determined. The vehicle route can be determined based on route parameters and/or otherwise determined. Route parameters can be user determined, automatically determined, customer-determined, and/or otherwise determined. Route parameters can include one or more: waypoints, geographic areas (e.g., geofences, etc.), series of geographic locations cooperatively forming a route, directions, times (e.g., waypoint arrival times, trip beginning, trip end, etc.), vehicle operation parameters (e.g., vehicle speed, vehicle acceleration), no-entry zones (e.g., no-fly zones), events (e.g., anticipated, current, past, etc.), geographic regions (e.g., corresponding to events of interest), events (e.g., selected by a vehicle entity to avoid), and/or any other suitable parameter.

Route parameters can optionally include a vehicle interaction region. The vehicle interaction region can define the region to be monitored for events (e.g., geographic regions for the vehicle route), the region that the vehicle affects (e.g., through backwash, region of uncertainty, region of potential movement, etc.), the region that can affect vehicle operation (e.g., where obstacles and/or forces within the region can change vehicle operation), and/or define any other suitable region. The vehicle interaction region preferably surrounds the vehicle 210, but can alternatively be distal the vehicle 210 (e.g., be a toroid centered about the vehicle 210) and/or otherwise related to the vehicle 210. In an example, the vehicle interaction region can be associated with environmental interaction for vehicles 210 within a vehicle class (e.g., describing how vehicles 210 within the vehicle class interact with the surrounding environment, such as in relation to vehicle components, such as locomotor mechanisms and/or vehicle sensors corresponding to the vehicle class, etc.). The vehicle interaction region can be a radius from the vehicle 210, a geofence associated with the vehicle 210 (e.g., about the vehicle 210), a volume proximal the vehicle 210 (e.g., surrounding the vehicle 210), any suitable dimensions (e.g., relating to geometry, time, sensors, motion, etc.) and/or be otherwise defined. The vehicle interaction region can be determined by a user (e.g., the vehicle entity), by the vehicle 210 (e.g., based on obstacles detected by on-board sensors, vehicle sensor data, etc.), by the deployment system 220 and/or another remote processing system (e.g., based on vehicle class, historical operation parameters, etc.), by vehicle parameters (e.g., vehicle footprint or dimensions, vehicle sensor data, vehicle class, other vehicle parameters), and/or otherwise determined. The vehicle interaction region can be the same (e.g., in size, dimension, area, etc.) for the entire route, vary along the vehicle route, and/or otherwise related to the vehicle route. The vehicle interaction region can be predetermined for each location along the vehicle route, be dynamically determined for each location while the vehicle 210 is en route, and/or be otherwise determined. The vehicle interaction region can be determined (e.g., automatically; dynamically) based on the vehicle class (e.g., terrestrial or aerial; large or small; lift mechanism type, etc.); vehicle operation parameters (e.g., current or future parameters), such as vehicle motion, such as acceleration or velocity; other vehicle parameters; event parameters (e.g., class, type, intensity, past duration, anticipated duration, number of proximal events, distance from the anticipated vehicle location; surrounding event parameters; etc.); analysis of on-board vehicle sensor streams (e.g., increased in response to detected in-path obstacles, re-drawn to exclude in-path obstacles, etc.); and/or be otherwise determined. However, the vehicle 210, vehicular operation, vehicle parameters, routes, and/or other associated components can be configured in any suitable manner.

The deployment system 220 can function to control operation of one or more vehicles 210. The deployment system 220 can monitor deployed vehicles (e.g., vehicles en-route for a vehicle route; receive telemetry data such as vehicle sensor data and/or route-related communications from the deployed vehicles; monitor vehicle statuses; etc.); receive event information from the event system 230; determine vehicle control instructions (e.g., for deployment and/or subsequent vehicular operation, etc.), such as the route parameters (e.g., for traveling along a determined vehicle route, etc.) and/or vehicle operation parameters (e.g., received from an operator, automatically generated based on the events, for operating vehicle components, etc.); remotely control the vehicles 210 (e.g., by transmitting the control instructions to the vehicle 210 and/or vehicle entity); and/or perform any other suitable set of operations. The deployment system 220 is preferably remote from the vehicle 210 (e.g., be a remote processing system communicably connected by a communications system, such as a cellular communications system), but can additionally or alternatively be on-board the vehicle 210 and/or otherwise be physically associated with the vehicle 210 (e.g., where the deployment system 220 includes a remote processing system, a vehicle communications system, and a vehicle processing system, etc.). The deployment system 220 is preferably controlled by the vehicle entity, but can be otherwise controlled. However, the deployment system 220 can be configured in any suitable manner.

The event system 230 of the vehicle operation system can function to detect events based on external signals and/or other suitable signals. In particular, the event system 230 can monitor a plurality of geographic regions for external signals indicative of occurrence of one or more events. Each geographic region can include (e.g., encompass fully or partially, etc.) one or more geographic locations (e.g., base unit of physical location measurement; location referenced by geographic coordinates; etc.). The event system 230 can be remote from the vehicle 210 (e.g., be included in a remote processing system), remote from the deployment system 220, integrated into the vehicle 210 (e.g., using distributed computing) and/or deployment system 220, and/or otherwise be arranged (e.g., physically or logically integrated, etc.).

Geographic regions can additionally or alternatively include geo cells, which can act as a cell in a grid in any form. Geo cells can have any suitable geometry (e.g., squares, rectangles, spheres, circles, hexagons, triangles, etc.). In a variation, geo cells can be arranged in a hierarchical structure (e.g., be a hierarchical geospatial indexing system such as a geohash, etc.), but can additionally or alternatively be arranged in any suitable structure.

Geo cells are preferably a geocoding system which encodes a geographic location into a string of letters and digits (e.g., a code; a short string of letters and digits with a number of characters below a threshold; etc.), but can additionally or alternatively encode geographic locations into any suitable data structures. In an example, a geo cell is a hierarchical spatial data structure which subdivides space into buckets of grid shape (e.g., a square).

In a variation, geo cells can enable arbitrary precision and the possibility of gradually removing characters from the end of the code to reduce its size, and gradually lose precision. As a consequence of the gradual precision degradation, proximal geographic locations can often present similar prefixes, but proximal geographic locations can be similar or dissimilar with respect to any suitable aspects of geo cells. For example, the longer a shared prefix is, the closer the two places are.

In a variation, geo cells can be used as a unique identifier and to represent point data (e.g., in databases). In an example, a geo cell is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. Geo cell can refer to an encoding of this area or point, where the geo cell can be a binary string comprised of 0s and 1s corresponding to the area or point, or a string comprised of 0s, 1s, and a ternary character (e.g., X)—which is used to refer to a "do not care" character (0 or 1). A geo cell can additionally or alternatively be represented as a string encoding of the area or point. For example, one possible encoding is base-32, where every 5 binary characters are encoded as an ASCII character.

In examples, depending on latitude, the size of an area defined at a specified geo cell precision can vary. In a specific example, as shown in Table 1, the areas defined at various geo cell precisions are approximately:

TABLE 1

Example Areas at Various Geo Cell Precisions

| geo cell Length/Precision | width × height |
| --- | --- |
| 1 | 5,009.4 km × 4,992.6 km |
| 2 | 1,252.3 km × 624.1 km |

TABLE 1-continued

Example Areas at Various Geo Cell Precisions

| geo cell Length/Precision | width × height |
|---|---|
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Additionally or alternatively, geo cell geometries can include hexagonal tiling, triangular tiling, and/or any other suitable geometric shape tiling. For example, the H3 geospatial indexing system can be a multi-precision hexagonal tiling of a sphere (e.g., the Earth) indexed with hierarchical linear indexes.

In another variation, geo cells can be a hierarchical decomposition of a sphere (e.g., the Earth) into representations of regions or points based on a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (e.g., a space-filling curve that converts multiple dimensions into one dimension and preserves the locality). However, geo cells can be based on any suitable application of Hilbert Curves and/or other suitable curves.

In variations including geo cells of hierarchical structure, any signal (e.g., external signal), event, entity, vehicle, and/or other suitable component and/or data associated with a geo cell of a specified precision can by default be associated with any less precise geo cells that contain the geo cell. For example, if a signal is associated with a geo cell of precision 9, the signal is by default also associated with corresponding geo cells of precisions 1, 2, 3, 4, 5, 6, 7, and 8 due to the hierarchical nature of geo cells. Similar mechanisms can be analogously applicable to other tiling and geo cell arrangements. For example, S2 has a cell level hierarchy ranging from level zero (85,011,012 km$^2$) to level 30 (between 0.48 cm$^2$ to 0.96 cm$^2$).

The external signals are preferably received from external sources, but can alternatively be generated by the event system 230 and/or otherwise determined. The external signals are preferably received in real- or near-real time (e.g., as the signals are being generated by or at the signal source), but can alternatively be received asynchronously from signal generation. External signals can include any one or more of: transient or enduring posts authored by users and/or other entities on social networking systems (e.g., images, text posts, videos, live streams, etc.; such as from Facebook™, Twitter™, Snapchat™, and/or other social networking systems); weather reports and/or other weather data (e.g., received from metrology systems, secondary systems such as news outlets, etc.); emergency response information (e.g., from rapid emergency response systems, 911 call data, dispatch systems, etc.); traffic data (e.g., from traffic cameras or other traffic sensors or systems); flight tracking data (e.g., FAA data, air operator communication information, etc.); sensor streams from en-route vehicles 210 (e.g., forwarded from the deployment system 220, received from the vehicle itself, etc.), which can optionally be using the system 200 and/or method 100; other sensor data (e.g., optical sensor data; camera feeds from public cameras such as CCTV cameras; third party sensor data; listening device feeds; IoT device data; smart city sensor data; satellite data; air quality sensor data; environmental sensor data; etc.) communications from other vehicles (e.g., communications between vehicles, such as geographically proximal vehicles, etc.); public radio communications (e.g., among first responders and/or dispatchers, between air traffic controllers and pilots); other market data (e.g., for commodities markets, financial markets, etc.); scheduled event information (e.g., from databases of conferences, concerts, sports games, or other planned events); remote imaging (e.g., satellites, drone imagery); calendared information; and/or any other suitable signals. Traffic data can include any one or more of: ground traffic data; air traffic data; accident data (e.g., frequency, rate, type, etc.), crowd-sourced traffic data (e.g., crowd-sourced road information, etc.), traffic level; traffic laws such as no-fly zones; traffic lights; type of vehicular paths associated with geographic regions; and/or other suitable traffic data. External signal content can include any one or more of: images, video, audio, text, files, links, touch-related content, virtual reality, augmented reality, and/or any other suitable types of content.

The signals are preferably received and processed in near-real time, but can alternatively be batch-processed or otherwise processed. The event system 230 can extract one or more signal parameters (e.g., features; generation timestamp; geolocations; content parameters, such as text, sentiment, objects, object motion vectors; etc.) from the signal.

Each signal is preferably associated with a generation timestamp and a geographic region, and can additionally or alternatively be associated with other information (e.g., metadata). The generation timestamp is preferably indicative of the time the signal was generated (e.g., authored, created, recorded, etc.), but can additionally or alternatively reference the time that the event, described by the signal, occurred, or reference any other suitable time. The generation timestamp can be determined for and/or associated with the signal by the system generating the signal, by the event system 230 (e.g., based on the time the event system 230 receives the signal; based on other timestamped signals determined by the event system 230 to be related to the signal; etc.), and/or otherwise determined. The geographic region associated with the signal is preferably indicative of where the signal was generated (e.g., authored, recorded, created, etc.), but can additionally or alternatively be indicative of where the described event occurred. The geographic region associated with the signal is preferably determined by the system generating the signal (e.g., the physical location of the signal-generating system when the signal was generated), but can additionally or alternatively be generated by the event system 230 (e.g., be extracted from the content of the signal, such as an address referenced in an emergency response call or the geolocation of an image included in a social networking post, etc.) and/or otherwise determined. When the signal is associated with a geographic region larger than a single geographic location, the signal is preferably assigned to each geographic location within the geographic region. The signal can additionally or alternatively be assigned to geographic locations outside of the geographic region (e.g., based on the content of the signal). For example, an image of smoke in the distance can be associated with a geographic location a predetermined distance away from the tagged image geolocation (e.g., where the distance can be determined based on the type of camera, the zoom degree, the proportion of the smoke to the remainder of the image, and/or the estimated actual height of the smoke, as determined from other signals monitoring the same smoke source). However, the signals can be associated with any other suitable set of information, determined in any other suitable manner.

The event system 230 preferably analyzes the geographic regions for events using the systems and/or methods (e.g., using types of external signals) disclosed in U.S. application Ser. Nos. 14/643,958 and 15/250,735, which are each incorporated in their entireties by this reference, but can additionally or alternatively analyze the geographic regions for events in any other suitable manner. The event system 230 can monitor: all geographic locations (e.g., every square inch of the world); a predetermined set of geographic regions (e.g., vehicle locations, predefined set of locations, etc.), a dynamically determined set of geographic regions (e.g., determined during vehicular operation along a vehicle route, etc.), and/or monitor any other suitable set of geographic regions or locations for events. In one variation, the event system 230 detects an event in the geographic region when a signal parameter (e.g., frequency of signals, frequency of a content type extracted from the signal, etc.) satisfies a predetermined pattern (e.g., global or local signal parameter pattern indicative of event occurrence). For example, an event can be detected when the signal parameter value increases beyond a reference value (e.g., historic parameter value for the geographic region and recurrent timeframe; threshold value; etc.). In a second variation, the event system 230 detects an event in the geographic region when the signal content substantially matches a predetermined value (e.g., a predetermined keyword appears in the text, a predetermined object appears in the image, etc.). Additionally or alternatively, the event can be otherwise detected from the external signals. However, the event system 230 can be configured in any suitable manner.

In a variation, on an ongoing basis, concurrently with signal ingestion (e.g., and also essentially in real-time), event system 230 and/or monitoring system 240 detect events based on signals. Events can be associated with a time and location based on the time and location of signals used to detect the events. A location can be anywhere across a geographic area, such as, the United States, a State, a defined area, an impacted area, an area defined by a geo cell, an address, and/or any other suitable representation of a location. Events can be detected from a single signal or from a plurality of signals. In an example, an event is detected based on the content of one or more signals. In another example, a potential event is detected based on the content of one or more signals and then validated as an event based on the content of one or more other signals.

The monitoring system 240 can function to monitor geographic regions for events of interest to the vehicle 210 and/or vehicle entity (e.g., for the specific vehicle 210, the vehicle fleet, the vehicle entity associated with the vehicles 210, etc.). For example, the monitoring system 240 can monitor the geographic regions (e.g., for evaluation in relation to one or more vehicles 210) for a given timeframe (e.g., the vehicle operation period), filter the events detected within the geographic regions for events of interest to the vehicle class (vehicle class events) and/or filter the vehicle class events for events of interest to the vehicle entity, and facilitate modification of vehicular operation (e.g., send a notification to the vehicle entity, etc.) when an event of interest to the vehicle entity (e.g., based on vehicle entity parameters, such as preferences, type, role, responsibilities, demographics, etc.) is detected.

The geographic regions can include the geographic regions along a vehicle route (e.g., within a predetermined distance of the vehicle route); the geographic regions for a plurality of vehicle routes; the geographic regions specified by a user; the geographic regions anticipated to be encountered by an en-route vehicle 210 within a predetermined period of time in the future; and/or any other suitable set of geographic regions associated with vehicle operation.

The monitoring system 240 preferably receives event information (e.g., event parameters, etc.) from the event system 230, but can additionally or alternatively receive deployment information from the deployment system 220 (e.g., route information), and/or receive any other suitable information from any other suitable source. The monitoring system 240 preferably provides information to the deployment system (e.g., control instructions, notifications, etc.), but can additionally or alternatively provide information to any other suitable source. The monitoring system 240 can be part of event system 230, complement the event system 230 (e.g., at a remote processing system), or be separate from the event system 230.

The monitoring system 240 preferably includes a set of modules, which can function to tailor event of interest determination (and/or subsequent processes performed based on the event of interest) for different vehicle parameters (e.g., for different vehicles 210, vehicle entities, vehicle classes, etc.) and/or for any other suitable components. The modules can be automatically determined, predetermined, manually received, learned from historic modules of the same or similar type (e.g., include common feature values that all vehicle entities request), and/or otherwise determined. Each module (e.g., of the monitoring system 240; of any suitable component of the system 200; purposed for performing any suitable portion of the method 100; etc.) can be validated, verified, reinforced, calibrated, and/or otherwise updated based on newly received, up-to-date data; historical data; and/or be updated based on any other suitable data.

The modules can optionally include thresholds and/or other conditions (e.g., signal parameter value threshold conditions; notification thresholds for determining whether to generate and/or provide notifications; etc.), instructions for facilitating vehicular operation (e.g., notification generation instructions, such as to use a first set of notification parameters for an event having a first set of parameter values; use a second set of notification parameters for an event having a second set of parameter values; etc.), and/or include any other suitable aspects for facilitating event of interest determination and/or subsequent processes performed. In a first variation, each module in the set is associated with a different vehicle 210 or vehicle entity, where each module monitors the respective geographic regions, independent of the regions monitored by other modules. In a second variation, the monitoring system 240 includes a set of chained modules, where each module serially filters the number of events to be considered. In this variation, the geographic regions across all vehicles 210 can be aggregated and monitored together, where the events detected in the aggregate region can be serially filtered to identify events of interest for a given vehicle 210. However, the monitoring system 240 can be otherwise structured.

In one variation, the monitoring system 240 can include a vehicle class module, a vehicle entity module, a vehicle module, and/or any other suitable set of modules. The vehicle class module can function to identify events, within the geographic regions, that are of interest to a vehicle class (e.g., affecting movement of the vehicle class). For example, the vehicle class module for aerial systems can detect events associated with smoke and news helicopters, but not identify road construction, while a vehicle class module for terrestrial systems can detect events associated with road construction. However, vehicle class modules can be configured in any suitable manner.

The vehicle entity module can function to identify events that the vehicle entity is interested in (e.g., where event class selections are received from the vehicle entity), where the module rules can be learned (e.g., from historic vehicle entity settings, from similar vehicle entities, etc.), received from the user, and/or otherwise determined. The vehicle entity module can be applied to a set of vehicles 210 associated with the vehicle entity. However, vehicle entity modules can be configured in any suitable manner.

The vehicle module can function to identify events specific to the vehicle (e.g., to the vehicle's route), but can be configured in any suitable manner. Additionally or alternatively, the monitoring system 240 can include any suitable set of modules configured in any suitable manner (e.g., modules tailored to any suitable vehicle parameter). However, the monitoring system 240 can be configured in any suitable manner.

4. Method

As shown in FIGS. 1A-1B, embodiments of a method 100 for facilitating event-based vehicle operation can include: determining a vehicle route S100; determining geographic regions for the vehicle route S200; monitoring the determined geographic regions for events S300; determining an event of interest from the detected events S400; and/or dynamically facilitating modification of vehicular operation of the vehicle based on the event of interest S500.

One or more instances and/or portions of the method 100 and/or processes described herein can be performed asynchronously (e.g., sequentially), concurrently (e.g., in parallel; concurrently on different threads for parallel computing to facilitating improved event-based vehicle operation for a plurality of vehicles, etc.), in temporal relation to a trigger event (e.g., performance of a portion of the method 100), and/or in any other suitable order at any suitable time and frequency by and/or using one or more instances of the system 200, components, and/or entities described herein. For example, any suitable portions of the method 100 can be performed (e.g., once, repeatedly, iteratively, etc.) during a time period of vehicular operation of one or more vehicles. Additionally or alternatively, the method 100 can be performed in any suitable manner analogous to that described in U.S. application Ser. Nos. 14/643,958 and 15/250,735, which are each incorporated in their entireties by this reference. However, the method 100 can be performed in any suitable manner.

Determining the vehicle route S100 can function to determine information indicative of where and when a vehicle will be travelling, and/or indicative of any other suitable route parameters and/or associated vehicle parameters (e.g., vehicle interaction regions in relation to the vehicle route, etc.). The vehicle route can additionally or alternatively determine the minimum set of geographic locations to be monitored for events (e.g., for reducing computation processing requirements, etc.). The vehicle route can be 2D (e.g., projected onto a map), 3D (e.g. include a vertical component; account for terrain; etc.), or have any suitable set of dimensions (e.g., include dimensions related to route parameters and/or vehicle parameters).

Figure 3:
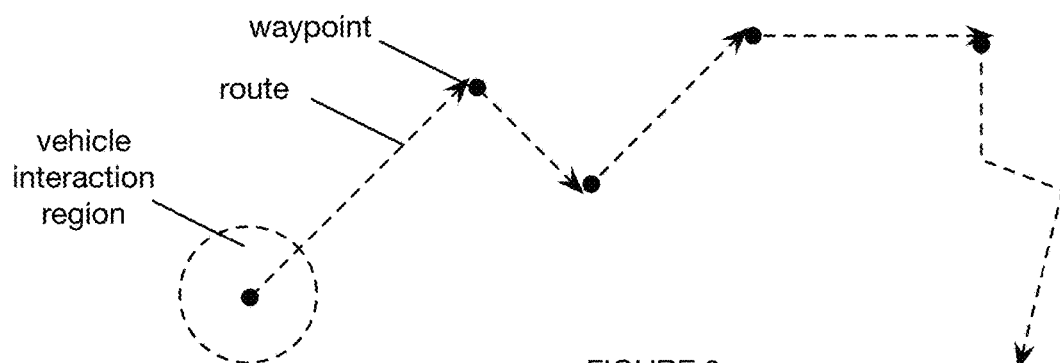
FIG. 3 is a schematic representation of a variation of the route parameters.

The vehicle route is preferably determined based on route parameters. The route parameters are preferably determined for a single vehicle, but can additionally or alternatively be determined for a plurality of vehicles (e.g., vehicle fleet, multiple vehicle fleets, etc.). For example determining vehicle routes can include determining waypoints for a plurality of vehicles, generating an accounting for potential vehicular travel overlap based on the waypoints (e.g., arrival of vehicles at proximal waypoints and overlapping time periods, such as where the vehicle interaction regions at the proximal waypoints overlap with each other, etc.); and adjusting vehicle routes based on the potential vehicular travel overlap. The route parameters can include those discussed above, or include any other suitable set of parameters. The route parameters can be received from the deployment system (e.g., imported, synchronized with the deployment system, received through a communication from the deployment system, received from a third party deployment system, etc.), received from a user, selected based on a set of vehicle parameters, received from the vehicle (e.g., calculated based off of sensor data sampled at the vehicle, etc.), automatically determined (e.g., from a set of predetermined waypoints, example shown in FIG. 3, the respective waypoint arrival times, and the on-going or anticipated events proximal the route), and/or otherwise determined. In examples, determining a vehicle route can be based on route parameters including one or more route optimization parameters, which can function to inform vehicle route determination to optimize for one or more of: travel time, battery life, fuel, durability, event of interest avoidance or attendance, and/or any other suitable parameters (e.g., suitable vehicle parameters and/or route parameters, etc.).

Additionally or alternatively, determining vehicle routes S100 can be based on any suitable data described herein. For example, determining a vehicle route can include determining adjustments to a vehicle route based on event parameters generated for a detected event of interest (e.g., adjusting a route that vehicle is currently traveling along to avoid an event of interest by a distance greater than a distance threshold derived from the vehicle interaction region, etc.).

Determining vehicle routes S100 can be performed once, repeatedly, and/or with any suitable frequency for one or more periods of vehicular operation. For example, the method 100 can include determining an initial vehicle route (e.g., before vehicle deployment) for the vehicle (e.g., based on route parameters collected by a vehicle entity; based on an initial event classified as an initial event of interest for the vehicle; etc.), and during the time period of the vehicular operation of the vehicle along the initial vehicle route, determining an updated vehicle route based on a current event of interest, the declassification of the initial event as an event of interest (e.g., based on external signals collected during vehicular operation, etc.) and/or other suitable data. In examples, dynamically facilitating modification of the vehicular operation (e.g., providing control instructions, determining notifications, providing adjusted vehicle routes, etc.) can be based on events of interest, declassifications of events of interest (e.g., events of interest that were previously used in determining a vehicle route, etc.), and/or other suitable data. However, determining vehicle routes can be performed at any suitable time and frequency.

Figure 16:
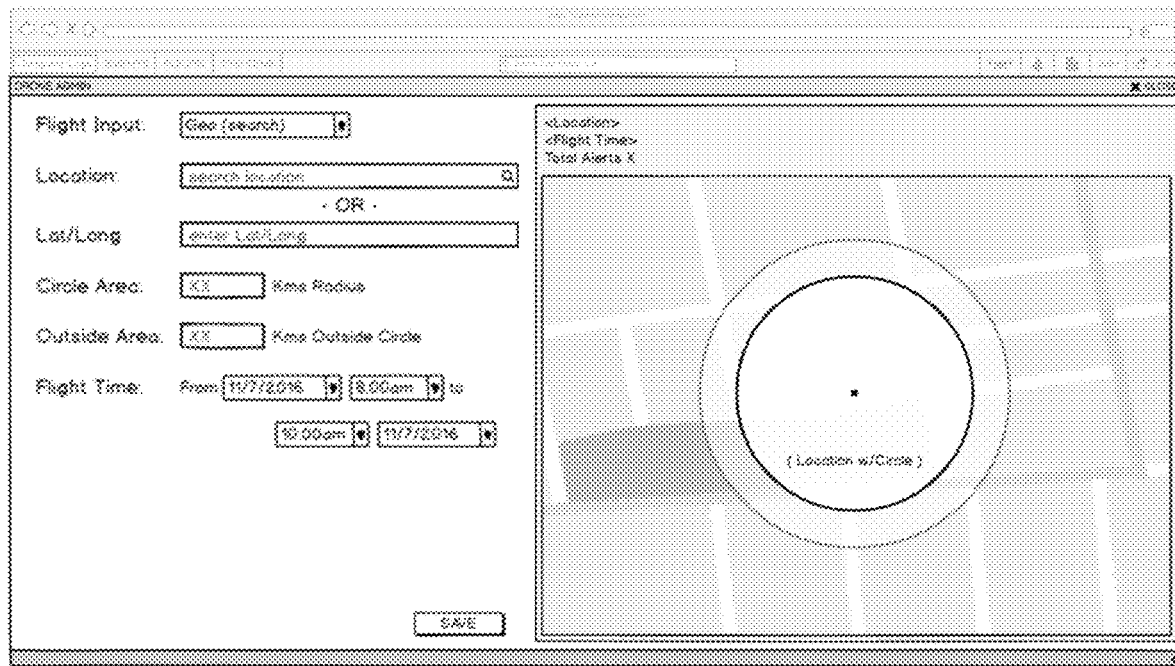
FIG. 16 is a schematic representation of an example of receiving a vehicle interaction region.
Figure 19:
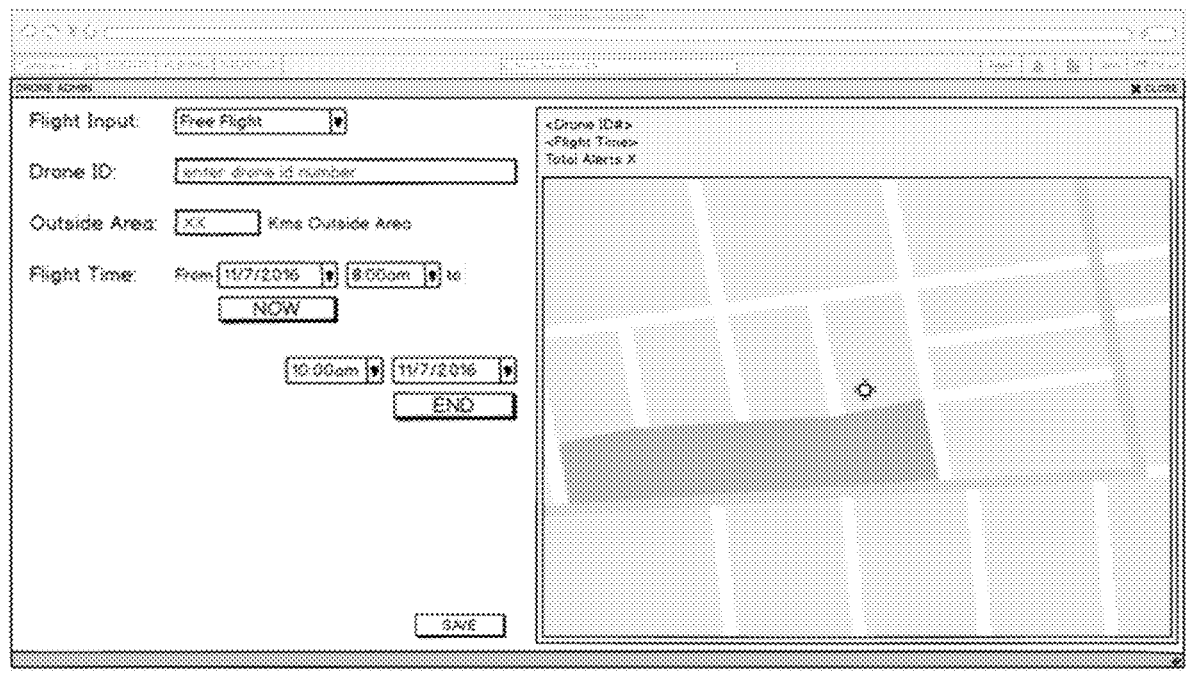
FIG. 19 is a schematic representation of an example of receiving an anticipated travel time.

In a first variation, the vehicle route is received from the deployment system (e.g., as shown in examples in FIGS. 16, 17, and 19). In a second variation, the vehicle route is determined by connecting waypoints with straight lines (e.g., as shown in an example in FIG. 18). In a third variation, determining the vehicle route includes computing an optimal path between a set of waypoints (e.g., optimizing for travel time, travel cost, etc.) based on optimization parameters, while satisfying temporal conditions (e.g., waypoint arrival times) and/or obstacle conditions (e.g., ongoing and/or anticipated events to avoid, obstacles to avoid, etc.) and/or other suitable conditions. However, the vehicle route can be otherwise determined in any suitable manner.

Figure 7:
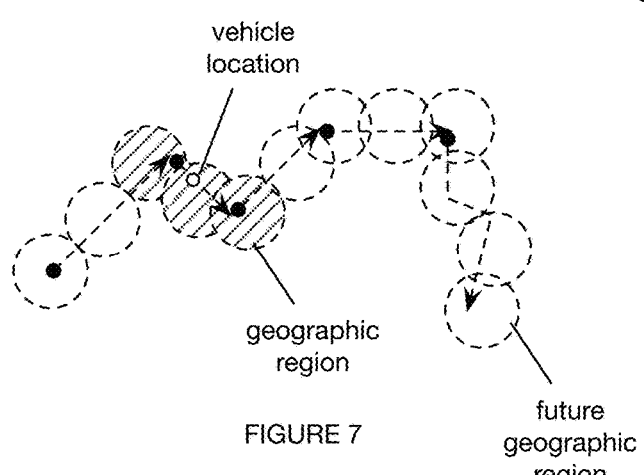
FIG. 7 is a schematic representation of a first variation of dynamically determining the geographic regions. as the vehicle moves.
Figure 8:
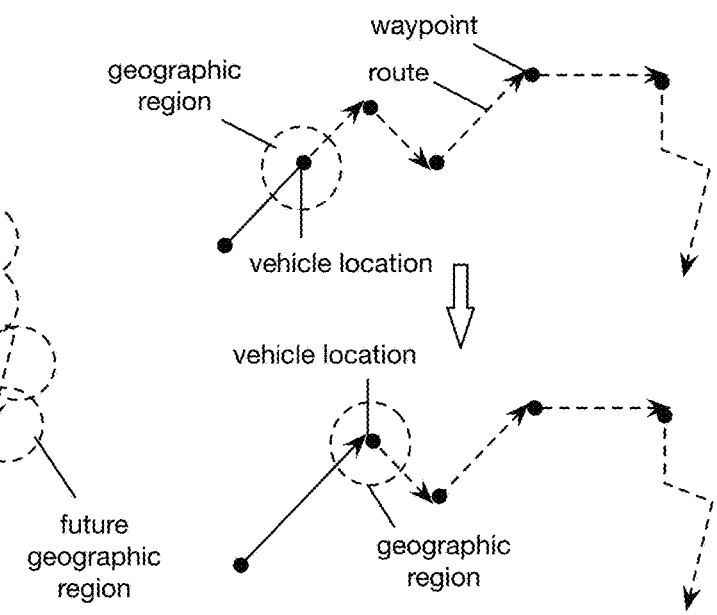
FIG. 8 is a schematic representation of a second variation of dynamically determining the geographic regions as the vehicle moves.

Determining the geographic regions for the vehicle route S200 can function to identify the geographic regions (e.g., limit the number of geographic regions, for improving computational efficiency, etc.) that are monitored for events. The geographic regions (e.g., geographic regions) are preferably identified based on the route parameters, but can be otherwise determined (e.g., based on vehicle parameters such as vehicle sensor data indicating vehicle location and/or movement, etc.). The geographic regions can be static (e.g., predetermined, locked to the route), dynamic (e.g., move with the vehicle), and/or otherwise determined. The geographic regions are preferably automatically identified, but can additionally or alternatively be manually identified and/or otherwise determined. The geographic regions are preferably determined by the monitoring system, but can alternatively be determined by the vehicle entity, event system, deployment system, vehicle, user, and/or by any other suitable system. The geographic regions can be identified: in response to vehicle route determination; in response to route parameter determination; periodically (e.g., at a predetermined frequency, while the vehicle is en-route, during other periods of vehicular operation etc.); dynamically (e.g., in response to occurrence of a geographic region identification event, continuously as a vehicle travels along a vehicle route, etc.); and/or at any other suitable time and frequency. In a first example, geographic regions can be determined every minute for the anticipated travel path to be covered in the next 5-10 minutes (e.g., based on the current vehicle location and motion parameters, such as acceleration and velocity), example shown in FIGS. 7 and 8. In a second example, geographic regions can be determined when an obstacle is detected in the vehicle path (e.g., from signals sampled by on-board sensors), when an event is detected proximal the vehicle path, or in response to occurrence of any other suitable geographic region identification event. In a third example, determining geographic regions can be performed at multiple times during a period of vehicular operation, such as where the method 100 can include dynamically determining a set of geographic regions based on a vehicle route during the time period of the vehicular operation, and in response to dynamically facilitating modification of the vehicular operation (e.g., controlling a vehicle to travel along an adjusted vehicle route, determining an adjusted vehicle route, etc.), determining an updated set of geographic regions for event monitoring based on the adjusted vehicle route.

Geographic regions can be determined for: the entire vehicle route, for a vehicle route segment (e.g., time-limited, distance-limited, waypoint-limited), and/or for any other suitable portion of the vehicle route. Geographic regions can be determined for: a single trip for a single vehicle, multiple trips for a single vehicle, a single route (e.g., that multiple vehicles traverse), multiple trips for multiple vehicles, or for any suitable time period, route, and/or set of vehicles.

Determining the geographic regions S200 can include: selecting, calculating, estimating, or otherwise determining the geographic regions. Determining the geographic regions can be based on vehicle interaction regions (e.g., determining initial vehicle routes, adjusted vehicle routes, and/or other suitable vehicle routes based on vehicle interaction regions, etc.). For example, determining the geographic region can include: using the vehicle interaction region (VIR) as the geographic region; sweeping a predetermined region or volume (e.g., the VIR) along the route; determining an interaction region for each of a set of points along the route (e.g., every geographic location, every predetermined route distance, etc.) based on the point location, vehicle velocity, arrival time, proximal events, or other variables; selecting a set of pre-defined geofences that cooperatively encompass the route (e.g., geofences already monitored by the monitoring system, geofences already monitored by the event system, etc.); or otherwise determining the geographic region. Multiple determined regions can have the same or differing shape, size, or other parameter.

Figure 4:
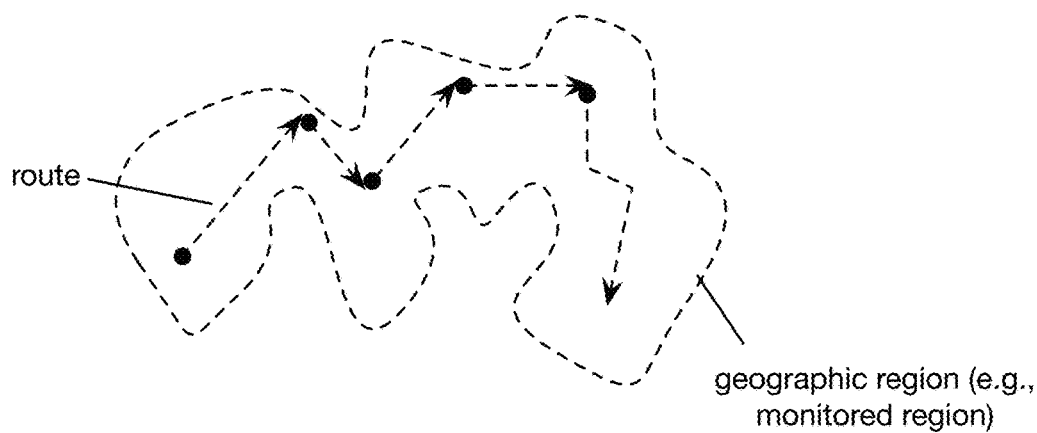
FIG. 4 is a schematic representation of a first variation of determining the geographic regions.
Figure 5:
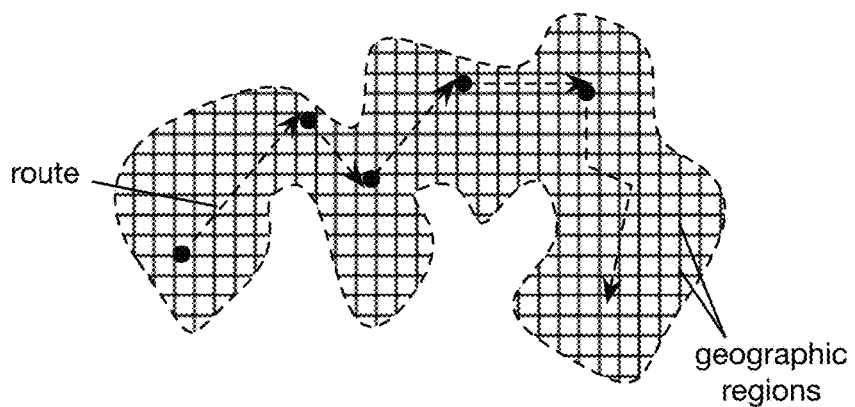
FIG. 5 is a schematic representation of a second variation of determining the geographic regions, where the geographic regions include a set of geographic locations.
Figure 6:
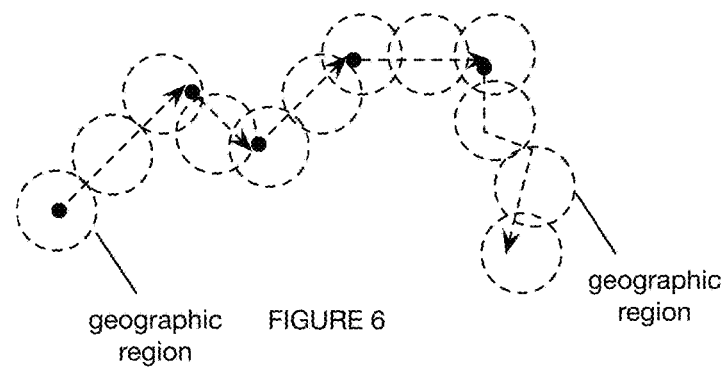
FIG. 6 is a schematic representation of a third variation of determining the geographic regions.

Determining the geographic region S200 can optionally include: aggregating geographic regions (e.g., merging multiple determined regions, etc.); segmenting the resultant region (e.g., merged, originally determined, example shown in FIG. 4) into sub-regions (e.g., defining contiguous and/or overlapping geographic regions cooperatively encompassing the vehicle route, as shown in an example in FIG. 6); identifying the geographic locations encompassed by the determined region (e.g., monitoring the individual geographic locations, as shown in an example in FIG. 5); or otherwise processing the determined regions. At any given time, the system 200 can monitor, for a given vehicle: one determined region (e.g., merged region, sub-region, etc.), multiple adjacent regions, multiple separate regions, or any suitable set of regions. The geographic region can be the region encompassing the vehicle, adjacent the vehicle (e.g., to be travelled within a threshold time period, within the same leg of the trip, etc.), distal the vehicle, or be any other suitable region. Geographic regions in the set can be constantly monitored or selectively monitored (e.g., based on the vehicle location and/or motion parameters; move with the vehicle, example shown in FIG. 8; etc.). However, the geographic regions can be otherwise determined.

The method 100 can additionally or alternatively include aggregating geographic regions (e.g., geographic regions determined across multiple vehicle routes, such as for a plurality of vehicles; geographic regions determined for a single vehicle route; etc.) which can function to minimize and/or eliminate redundancies in monitored geolocations across the set of monitored routes (e.g., for improving the processing system itself; etc.). For example, the method 100 can include aggregating a set of geographic regions into an aggregate region (e.g., based on overlapping geographic regions and/or other suitable parameters, etc.) associated with different vehicle routes; collecting external signals for the aggregate region; and detecting a set of events associated with the aggregate region (e.g., where the event locations are within the aggregate region, etc.) based on the external signals. The multiple routes associated with geographic region aggregation can be for the same vehicle, multiple vehicles (e.g., with similar waypoint arrival times; associated with routes within a threshold time period of each other; etc.), and/or for any suitable set of vehicles and/or time period. In one variation, the geographic regions are aggregated by aggregating the geographic locations for the multiple routes, then determining one or more geographic super-regions collectively encompassing all or a majority of the locations. In a second variation, the geographic regions are aggregated by adding the geographic regions for the multiple routes to a common list or map, or merging contiguous geographic regions together. However, the geographic regions can be aggregated in any other suitable manner.

Figure 9:
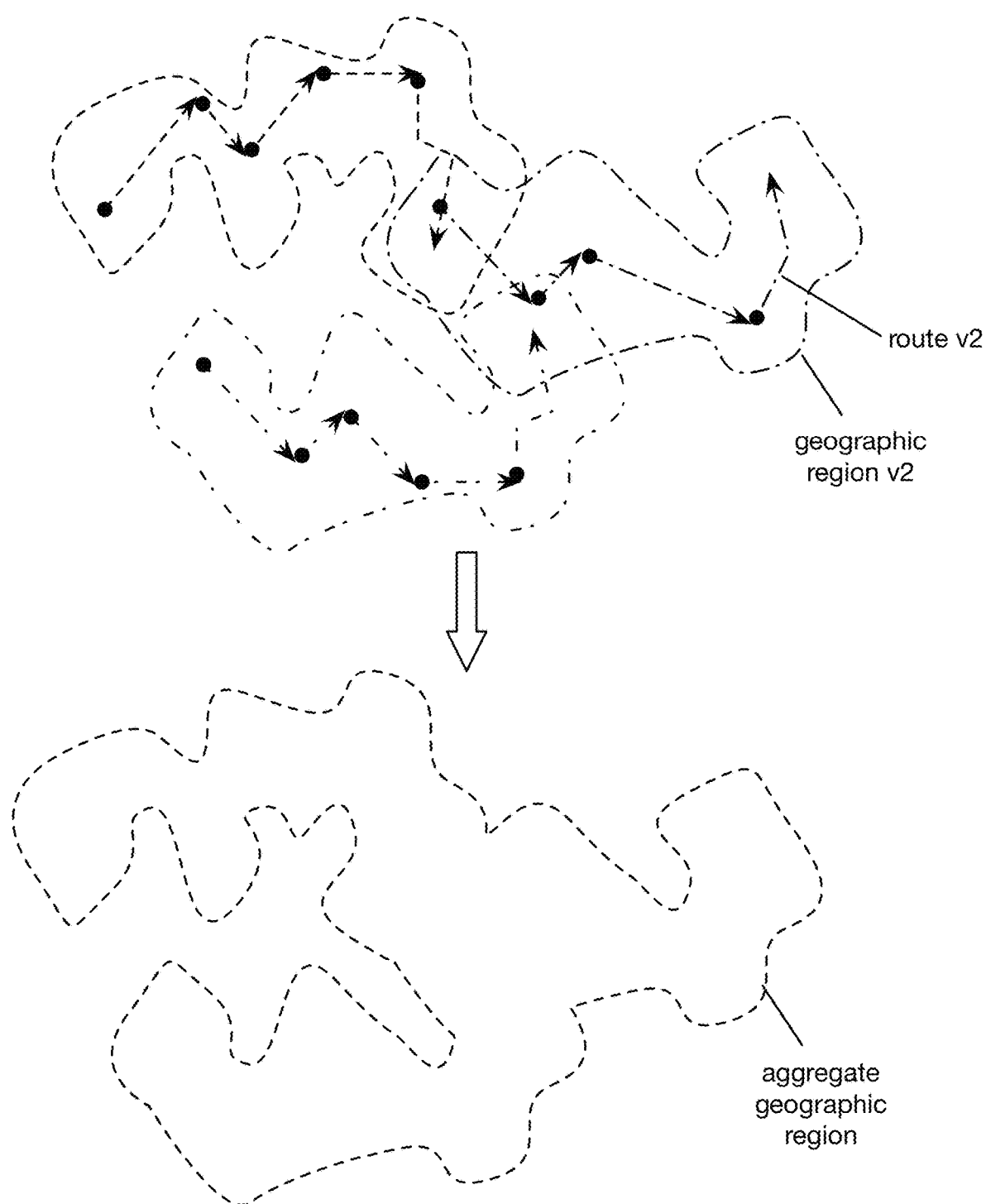
FIG. 9 is a schematic representation of a fourth variation of determining the geographic region.

Aggregating geographic regions can optionally include selecting trips (or portions thereof) for aggregation (as shown in an example in FIG. 9). In one variation, the trips selected for aggregation include segments of different vehicle routes sharing a common time period (e.g., all selected vehicle route segments will be travelled within the next 20 minutes), where the time period and/or time duration can be determined manually, automatically, and/or otherwise determined. For example, aggregating geographic regions can include identifying overlapping geographic regions (e.g., with any suitable amount of geographic overlap, etc.) including a first geographic region and a second geographic region associated with a first vehicle route and a second vehicle route, respectively; estimating a first time period for arrival of a first vehicle of a set of vehicles at the first geographic region; estimating a second time period for arrival of a second vehicle of the set of vehicles at the second geographic region; and in response to the second time period being within a threshold time duration of the first time period (e.g., where vehicle interactions regions for the first and second vehicles would overlap, etc.), aggregating the first and second overlapping geographic regions into the aggregate region.

Figure 10A:
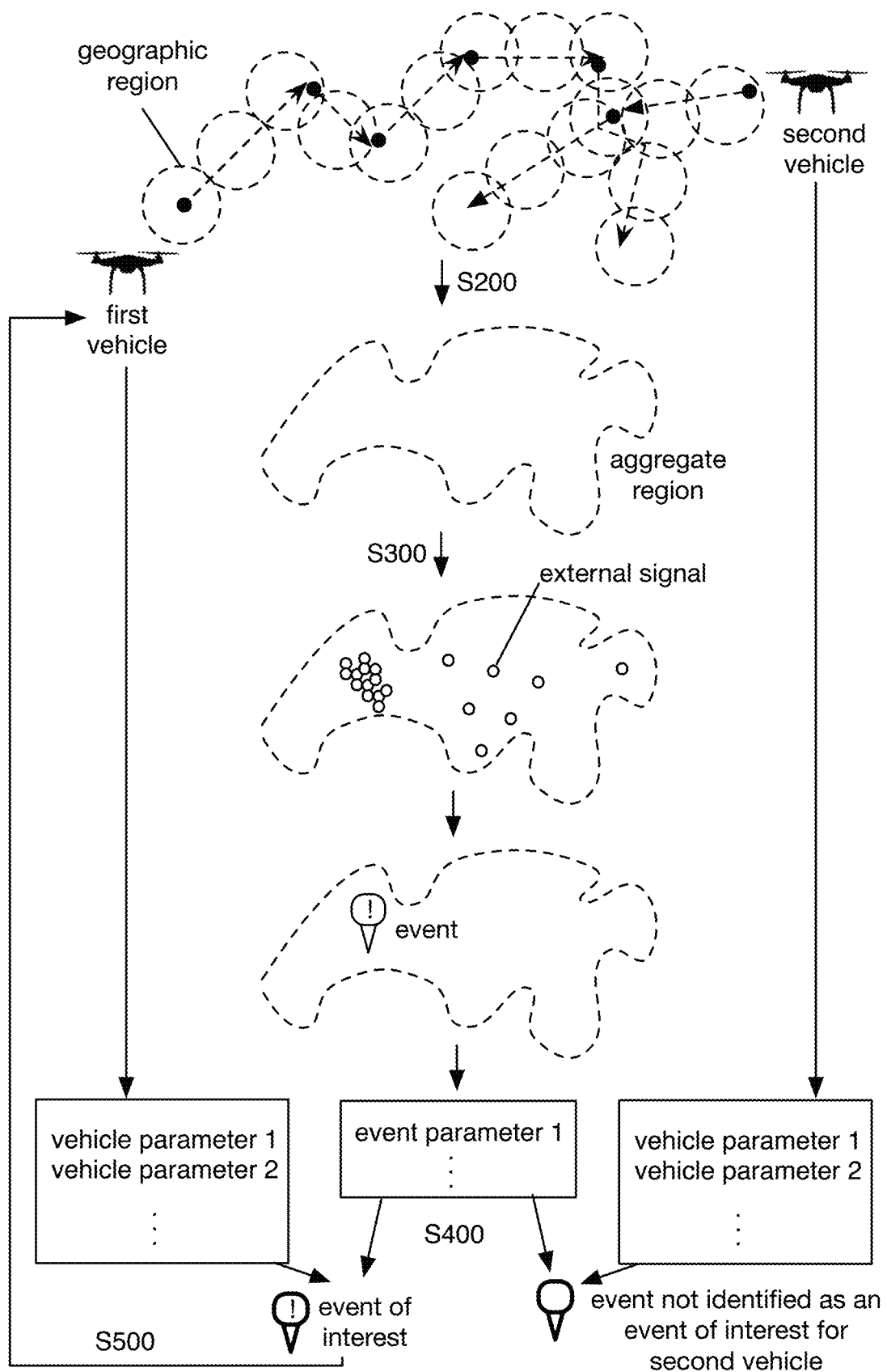
FIGS. 10A-10B are schematic representations of variations of the method associated with aggregate regions.
Figure 10B:
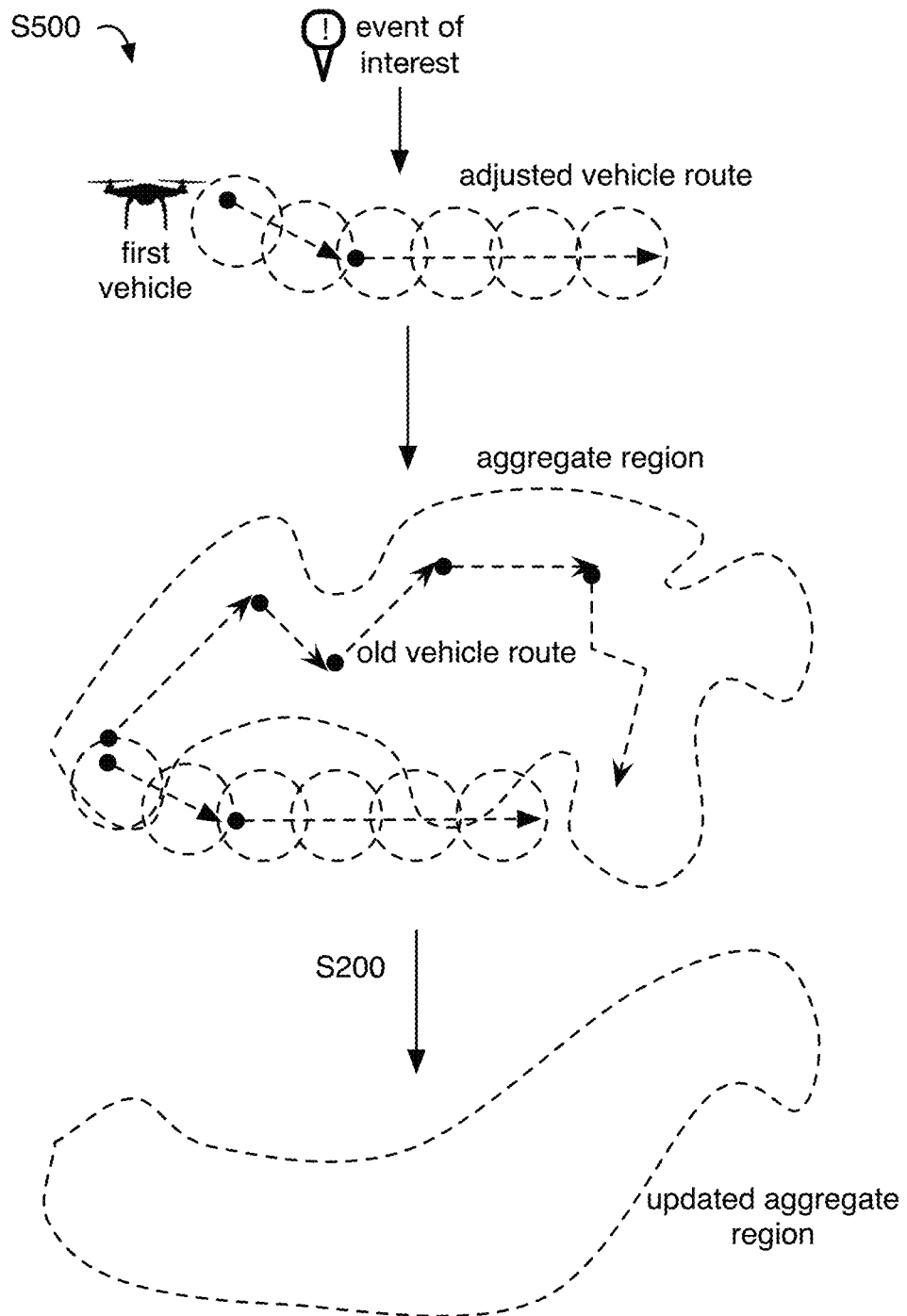

In a second variation, the trips selected for aggregation include segments of different vehicle routes within a predetermined geofence or distance of each other (e.g., all selected vehicle route segments are within 10 mi of each other), where the geofence or distance can be manually determined, automatically determined, and/or otherwise determined. In a third variation, the trips selected for aggregation include trips from a common vehicle class (e.g., aggregating geographic regions from all or a portion of aerial vehicles, drones, helicopters, vehicles with similar vehicle interaction regions, etc.) and/or other suitable vehicle parameter (e.g., sharing a module type used for event of interest identification, etc.). In a fourth variation, the trips selected for aggregation include trips from a common vehicle entity. In a fifth variation, aggregating geographic regions can include updating aggregate regions (e.g., as vehicles travel along vehicle routes, as vehicle routes are adjusted, etc.). In an example (e.g., as shown in FIG. 10B), the method 100 can include: determining an adjusted vehicle route (e.g., as part of dynamically facilitating vehicular operation modification, etc.) for a vehicle based on an event of interest for the vehicle, determining an updated set of geographic regions for the vehicle based on the adjusted vehicle route; and determining an updated aggregate region based on overlap between the updated set of geographic regions and the aggregate region (e.g., an aggregate region initially determined and used in association with determining the event of interest, etc.).

Additionally or alternatively, the trips can be otherwise selected for aggregation, and/or aggregating geographic regions can be based on any suitable parameters. However, aggregating geographic regions can be performed in any suitable manner, and determining geographic regions can be performed in any suitable manner.

Monitoring the determined geographic regions for events S300 can function to identify the occurrence of events of interest associated with the vehicle route (e.g., proximal the vehicle route, etc.), such that the vehicle can be routed for avoiding or traveling to the event location (and/or associated geographic regions), such as while the event is on-going and/or has the ability to affect (e.g., interact) with vehicles. The geographic regions are preferably monitored by the monitoring system, but can alternatively be monitored by the event system and/or by any other suitable system. The geographic regions are preferably monitored while the vehicle is deployed (e.g., en-route), where the geographic regions can be monitored at a predetermined frequency, when new signals are received, or at any other suitable time, but can additionally or alternatively be monitored for a predetermined period before and/or after the vehicle is deployed, monitored for a predetermined period before and/or after the vehicle reaches the geographic region, or monitored at or for any other suitable time and/or time period.

Monitoring the determined geographic regions for events S300 can include: receiving signals from external sources; determining the geographic region for each signal; extracting event features from the set of signals mapped to each geographic region; and detecting an event based on the event features for the geographic region. However, the geographic regions can be otherwise monitored.

Receiving signals from external sources can function to obtain raw and/or processed signals potentially indicative of one or more event parameters, for determining events of interest, for facilitating vehicular operation modification, and/or for performing other portions of the method 100. The signals (e.g., external signals, etc.) preferably include those described herein, but can include other signals. The signals are preferably received by the event system but can be received by any other suitable system. The signals are preferably received in real- or near-real time, but can alternatively be received at any other suitable time and frequency. Signal collection for one or more geographic regions of a set of geographic regions can be based on (e.g., conditioned based on), temporal indicators (e.g., collecting external signals for a predetermined period of time), vehicle parameters (e.g., collecting external signals for a geographic region while a vehicle location is within a threshold distance of the geographic region, etc.), route parameters, and/or any other suitable data. For example, collecting external signals for a set of geographic regions can include: during a first time period within a time period of the vehicular operation, collecting first signals for a first subset of geographic regions of the set of geographic regions based on first vehicle sensor data (e.g., indicating geographic proximity of the vehicle from the first subset of geographic regions, etc.) sampled by the first vehicle during the first time period; during a second time period within the time period of the vehicular operation: ceasing signal collection (e.g., to reduce computational processing requirements, etc.) for the first subset of geographic regions based on second vehicle sensor data sampled by the first vehicle during the second time period (e.g., indicating that the vehicle is at a geographic distance exceeding a threshold distance from the first subset of geographic regions; etc.); and collecting second external signals for a second subset of geographic regions of the set of geographic regions (e.g., to detect and/or characterize additional events for the second subset of geographic regions, etc.). However, collecting external signals can be performed in any suitable manner.

Determining the geographic region for each signal can function to map the raw signal to a geographic region (e.g., for identifying the geographic region at which a signal was collected, which can be used to facilitate determination of a geographic region for which to map one or more events; etc.). In one variation, the signal is mapped to a single geographic location (e.g., GPS coordinate, geographic base unit, etc.), such as where an event detected based off of at least the signal can be mapped to the same geographic location and/or geographic region associated with the geographic location (e.g., encompassing the geographic location; etc.). In this variation, events can be detected for a monitored geographic region by identifying events associated with geographic locations encompassed by the monitored geographic region (e.g., where the signals, used in detecting the event, correspond to the geographic locations, etc.). In a second variation, the signal is mapped to a geographic region encompassing a set of geographic locations. In this variation, the signal (and/or extracted feature values) can be mapped to the geographic region as a whole, mapped to each geographic location within the geographic region, or be mapped to any other suitable geographic representation. In one embodiment, the geographic region is a monitored geographic region. In a second embodiment, the geographic region is the signal's geographic region (e.g., geographic region that the signal is tagged with). For example, the geographic region can be defined by the radius of uncertainty centered on a geographic location. In a second example, the geographic region can be defined by the geopolitical and/or physical boundaries associated with the geographic identifier for the signal (e.g., the building associated with the address mentioned in the emergency response call; the city associated with the social networking system post; etc.). Additionally or alternatively, the signals, events, associated data (e.g., geographic region tags for signals, etc.) and/or other suitable data and/or components can be mapped to any suitable geographic region in any suitable manner. However, monitoring geographic regions S300 can be performed in any suitable manner.

Extracting event features from the set of signals can function to determine values that can be used to compute whether an event is occurring in the geographic region. The event features are preferably determined for each geographic region, from the signals mapped to the respective geographic region (e.g., indicating that the event corresponding to the signals is occurring at or proximal the geographic region, etc.), but can alternatively be determined from any other suitable set of signals. The event features are preferably extracted from signals associated with the same time period (e.g., generated or referencing a time within is of each other), but can alternatively be extracted from any other suitable set of signals. Event features can be extracted from the content of the signals, the characteristics of the signal set (e.g., frequency, temporal or spatial distribution), or from any other suitable aspect of the signal set. The event features can be extracted using regression, classification, neural networks (e.g., convolutional neural networks), heuristics, equations (e.g., weighted equations, etc.), selection (e.g., from a library), instance-based methods (e.g., nearest neighbor), regularization methods (e.g., ridge regression), decision trees, Bayesian methods, kernel methods, probability, deterministics, or any other suitable method.

Detecting the event based on the event features for the geographic region can function to determine that an event has occurred within the geographic region. The event can be an on-going event (e.g., current event), past event, or future event (e.g., anticipated event). The event can be detected for a geographic region (e.g., where the event location within the geographic region can be subsequently determined), a geographic location (e.g., where the events for all geographic locations can be aggregated when monitoring a geographic region), or for any other suitable set of geographic locations.

In a first variation, an event is detected based on the signal strength (e.g., post frequency, feature value, event probability, anomaly probability) for a geographic region, where an event is detected when the signal strength exceeds a threshold signal strength. The threshold signal strength can be the historic signal strength for the respective geographic region and timeframe, be a manually-determined threshold for the respective geographic region and/or timeframe, be the adjacent region's signal strength, or be any other suitable threshold. In a specific example, monitoring the geographic regions for events can include collecting a set of posts from a set of social networking systems (and/or collecting other suitable external signals) assigning a subset of posts from the set of posts to one or more geographic regions of the set of geographic regions; determining a keyword frequency (and/or other suitable post-related feature) for the subset of posts; and detecting an event for one or more geographic regions in response to the keyword frequency exceeding a historic keyword frequency (and/or other suitable post-related feature value exceeding a historical post-related feature value) for the one or more geographic regions.

Additionally or alternatively, an event can be detected when the signal strength exceeds the threshold signal strength for a threshold period of time (e.g., a manually period of time, a learned period of time, etc.).

In a second variation, an event is detected when the signal patterns (e.g., temporal, spatial, etc.) substantially matches a predetermined pattern associated with an event or event category (e.g., event type). The predetermined pattern can be learned (e.g., based on past identified events for the geographic region and/or other geographic regions), manually determined, and/or otherwise determined.

In a third variation, an event is detected based on the signal content. For example, an event can be detected when the signal includes content pre-associated with event occurrence (keywords, atypical objects for the location).

In a fourth variation, an event is detected when signals from a specified source are received. For example, an event can be detected for a geographic region whenever an emergency stream mentions and/or originates from a location encompassed by the geographic region.

In a fifth variation, an event is detected by applying regression, classification, neural networks (e.g., convolutional neural networks), heuristics, equations (e.g., weighted equations, etc.), selection (e.g., from a library), instance-based methods (e.g., nearest neighbor), regularization methods (e.g., ridge regression), decision trees, Bayesian methods, kernel methods, probability, deterministics, or any other suitable method to the extracted event features for the geographic region.

Determining the event can additionally or alternatively include determining event parameters for the detected event, which can function to determine parameters describing the event. The event parameters can be determined before, after, or during event detection. Event parameters can include: whether an event is occurring (e.g., a binary classification, a probability, etc.), the event category (e.g., traffic, sports, games, accidents, fire, natural disasters, entertainment, concerts, no-fly zones, wireless signal dead-zones, etc.), event severity, event truthfulness, event content (e.g., event title, event description, etc.), event time (e.g., estimated and/or anticipated start time, end time, duration, etc.), event location (e.g., center; nexus), event extent or volume (e.g., event geofence, geographic region, physical dimensions effected, etc.), event entities (e.g., users proximal the event or otherwise related to the event), associated confidence levels (e.g., for other event parameters, etc.) and/or any other suitable event parameters. The event parameters can be determined based on the extracted features, signal content, or based on any other suitable information. The event parameters can be determined using regression, classification, neural networks (e.g., convolutional neural networks), heuristics, equations (e.g., weighted equations, etc.), selection (e.g., from a library), instance-based methods (e.g., nearest neighbor), regularization methods (e.g., ridge regression), decision trees, Bayesian methods, kernel methods, probability, deterministics, or any other suitable method. In one example, the event can be classified and the event extent determined based on the event class. In a second example, the event extent can be determined from the proportion of an image frame occupied by smoke. In a third example, the event extent can be determined from signals, generated within a predetermined time frame of the event time, that are mapped to geographic regions surrounding the event location. In a fourth example, determining event parameters for a set of events can include, for each event of the set of events: determining a category probability for an event category based on signals of the external signals, the signals associated with the event (e.g., signals assigned to geographic regions corresponding to the event; etc.); in response to the category probability exceeding a category probability threshold, categorizing the event with the event category, where determining the event of interest from the set of events can be based on the event category (and/or the vehicle parameter associated with the vehicle, and/or other suitable data, etc.). In a fifth example, events can be categorized into different categories (e.g., fire, police response, mass shooting, traffic accident, natural disaster, storm, active shooter, concerts, protests, etc.) based on the context of signals used to detect the events. In a sixth example, an event truthfulness can be determined for an event (e.g., by an event system 230 and/or monitoring system 240, etc.). An event truthfulness can indicate how likely it is that a detected event is actually an event (versus a hoax, fake, misinterpreted, etc.). In specific examples, truthfulness can range from less likely to be true to more likely to be true; and truthfulness can be represented as a numerical value (e.g., a score), such as, for example, from 1 (e.g., less truthful) to 10 (e.g., more truthful) and/or as percentage value in a percentage range, such as, for example, from 0% (e.g., less truthful) to 100% (e.g., more truthful). However, event truthfulness can be represented in any suitable manner. In a seventh example, an event severity can be determined for an event. Event severity can indicate how severe an event is (e.g., what degree of badness, what degree of damage, etc. is associated with the event), was, and/or will be. In a specific example, severity can range from less severe (e.g., a single vehicle accident without injuries) to more severe (e.g., multi vehicle accident with multiple injuries and a possible fatality). In another specific example, a shooting event can also range from less severe (e.g., one victim without life threatening injuries) to more severe (e.g., multiple injuries and multiple fatalities). Severity can be represented as a numerical value, such as, for example, from 1 (e.g., less severe) to 5 (e.g., more severe), and/or any other suitable representations.

Event parameters are preferably used in dynamically facilitating modification of vehicular operation, but can be used in any suitable portion of the method 100 and/or system 200. For example, a vehicle route optimizing for safety and/or other parameters can be determined to avoid events with an event severity greater than a threshold value (e.g., a low threshold, such as 10%, etc.), and/or an event truthfulness greater than a threshold value (e.g., a low threshold, such as 10%, etc.). In another example, a vehicle route can be determined to investigate events with an event truthfulness greater than a threshold value (e.g., greater than a predetermined or dynamically determined percentage probability of being true). However, event parameters can be utilized in any suitable manner.

Additionally or alternatively, event parameters can be determined in any suitable fashion described in and/or analogous to that described in U.S. application Ser. No. 14/643,958 and 15/250,735, which are each incorporated in their entireties by this reference. However, the event parameters can be otherwise determined.

Determining an event of interest from the detected events S400 can function to surface events relevant to a vehicle and/or vehicle entity (e.g., for highlighting particular events out of a set of detected events, to better facilitate improved event-based routing, etc.). Determining events of interest S400 is preferably based on vehicle parameters and/or event parameters (e.g., based on analyzing vehicle interaction regions and/or other parameters describing susceptibility of vehicles to events, in the context of event parameters informative of the event; etc.), but can additionally or alternatively be based on any suitable data.

Determining events of interest S400 can including determining events of interest with one or more modules (e.g., vehicle modules, such as for event filtering, etc.). For example, determining an event of interest can include filtering the set of events for the event of interest with a vehicle module (e.g., vehicle class module) of the set of vehicle modules (e.g., the vehicle module corresponding to the vehicle parameter associated with the vehicle, such as the vehicle class associated with the vehicle, etc.).

Any number of events of interest can be determined for any number of vehicles, vehicle entities, and/or other suitable components. For example (e.g., as shown in FIG. 10A), determining events of interest can include filtering the set of events for a first vehicle event of interest based on a first vehicle parameter associated with a first vehicle; filtering the set of events for a second vehicle event of interest based on a second parameter associated with the second vehicle; and where filtering the same set of events for the first and second vehicles improves computational efficiency of the processing system for facilitating the improved event-based vehicle routing for the set of vehicles.

Determining one or more events of interest S400 can be performed in relation to a trigger event (e.g., in response to detecting an event; in response to detecting a threshold number of events and/or type of event; vehicle deployment; vehicle arrival at a particular waypoint; etc.), at predetermined time intervals (e.g., every 5 minutes; etc.), and/or at any suitable time and frequency.

In a variation, the method 100 can include generating one or modules, such as based on vehicle parameters (e.g., associated with a set of vehicles, etc.), event parameters (e.g., historical event parameters, etc.), route parameters, and/or any other suitable data. In an example, the method 100 can include for each vehicle class of the different vehicle classes, determining a vehicle interaction region associated with environmental interaction for vehicles within the vehicle class; and for each vehicle class module of the set of vehicle class modules, determining the vehicle class module based on the vehicle interaction region for the corresponding vehicle class. However, generating, updating, and/or otherwise processing modules can be performed in any suitable manner, and determining events of interest can performed in any other suitable manner.

Dynamically facilitating modification of vehicular operation of the vehicle S500 can function to facilitate improvements in vehicle routing and/or other aspects of vehicular operation. Facilitating modification of the vehicular operation can include any one or more of: controlling one or more vehicles, determining an adjusted vehicle route, determining a notification, providing an event content stream with the notification, and/or any other suitable processes.

Facilitating vehicular operation modification S500 is preferably based on one or more events of interest (e.g., event parameters describing the events of interest) and/or vehicle parameters (e.g., current vehicle location, vehicle interaction region, etc.), but can be additionally or alternatively be based on any suitable data.

Facilitating modification of vehicular operation S500 can be performed for a single vehicle (e.g., the vehicle for which geographic regions were determined and events were detected, etc.), a plurality of vehicles (e.g., vehicles for which the same event of interest applies; vehicles associated with each other, such as through shared vehicle parameters; etc.), a single vehicle entity, multiple vehicle entities, and/or any number of entities. For example, facilitating modification of vehicular operation can include during a second vehicle time period associated with a second vehicle, dynamically facilitating re-routing of the second vehicle based on the event parameters, where the event parameters include an estimated end time of the event of interest (e.g., the event of interest identified for a first vehicle during a first vehicle time period, etc.). In a specific example, the method 100 can include estimating, for the second vehicle, a waypoint arrival time associated with a geographic region of the set of geographic regions based on a second vehicle parameter (e.g., parameters describing position, velocity, and/or acceleration, etc.), the geographic region corresponding to the event of interest; and in response to the waypoint arrival time being earlier than the estimated end time of the event of interest (e.g., where the vehicle interaction region would overlap with an event region of effect, etc.), dynamically facilitating modification of vehicular operation of the second vehicle (e.g., re-routing of the second vehicle, etc.).

Facilitating modification of vehicular operation S500 can additionally or alternatively include controlling one or more vehicles (e.g., one or more aspects of vehicular operation, etc.), which can function to improve vehicular operation (e.g., based on real-time data). Controlling one or more vehicles is preferably performed remotely (e.g., through a remote processing system), such as by generating control instructions for the vehicle, and transmitting the control instructions to the vehicle for execution by the vehicle processing system, but controlling vehicles additionally or alternatively can be performed locally (e.g., with a driver located in the vehicle, etc.), and/or in any suitable manner. In an example, the method 100 can include determining control instructions for the vehicle based on the adjusted vehicle route; facilitating remote control of the vehicle to travel along the adjusted vehicle route based on the control instructions; and monitoring updated geographic regions (e.g., an aggregate region updated based on the adjusted vehicle route, etc.) for additional events during the remote control of the vehicle. However, controlling one or more vehicles can be performed in any suitable manner.

Figure 13:
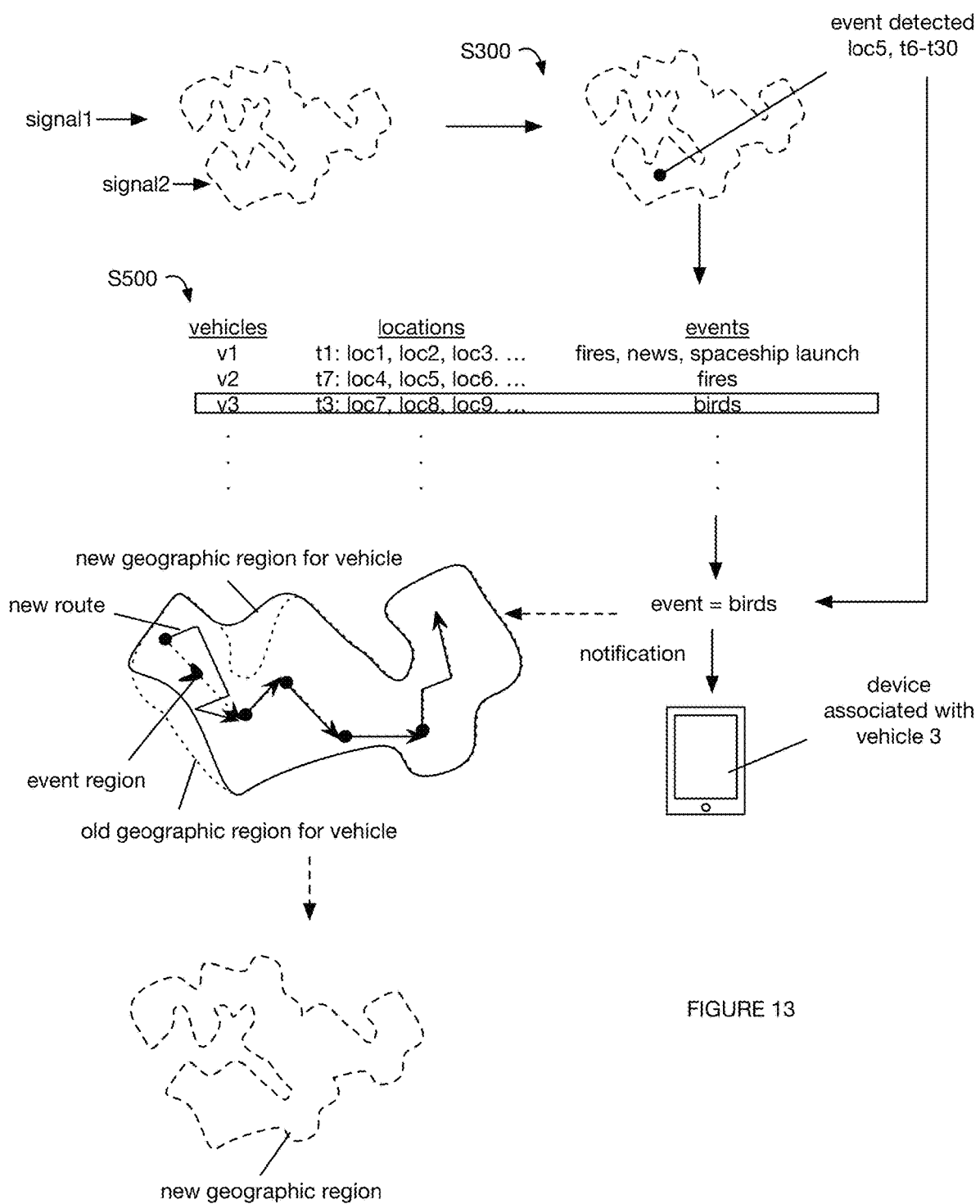
FIG. 13 is a schematic representation of a second variation of monitoring the geographic region for an event, including monitoring an aggregate geographic region, detecting an event within the geographic region, determining the event location, determining a vehicle associated with the event location for the event timeframe, notifying the vehicle and/or vehicle entity of the event, and optionally determining a new route for the vehicle and aggregate monitoring region.
Figure 14:
FIG. 14 is a schematic representation of an example of vehicle class module selection.
Figure 15:
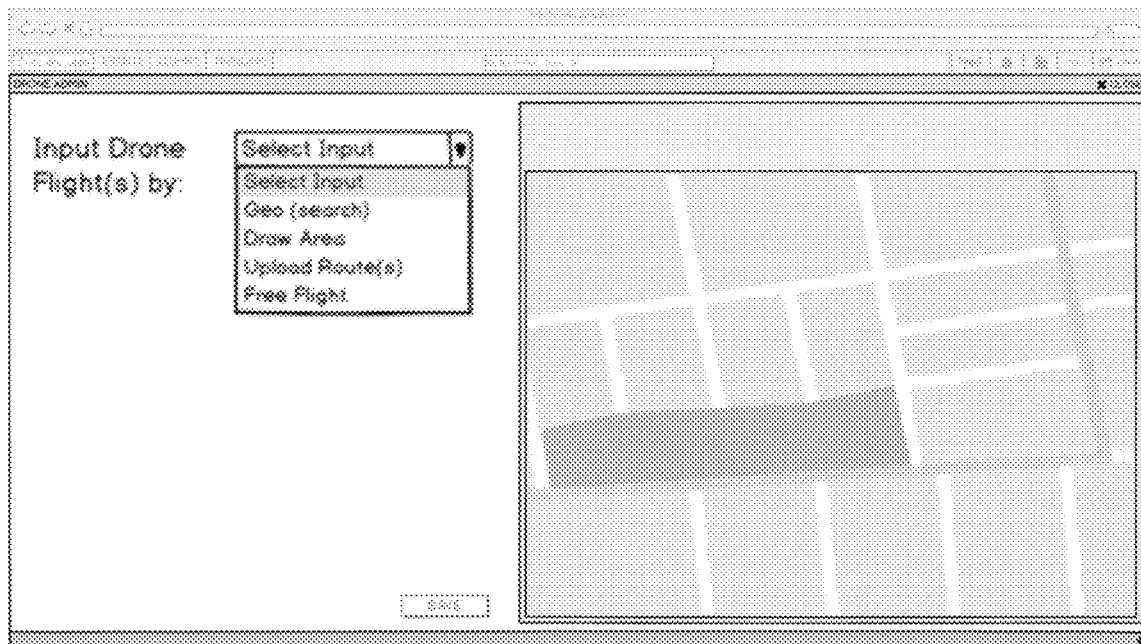
FIG. 15 is a schematic representation of an example of an interface for determining the route parameters.

Facilitating modification of vehicular operation S500 can additionally or alternatively include determining an adjusted vehicle route (e.g., as shown in FIG. 13), which can function to dynamically improve vehicle routing in relation to an event of interest (e.g., avoiding or attending an event of interest, etc.) Determining adjusted vehicle routes can include: classifying event as adverse, treating adverse events as no-traverse zones (e.g., no-fly, no-drive, no-sail zones), and determining new waypoints and/or routes that maintain a threshold distance between the event zone and the vehicle (e.g., using path optimization techniques, path planning, etc.). The threshold distance can be predetermined, be the interaction region, or be any other suitable region. Additionally or alternatively, the event can be classified as favorable and treated as a new waypoint (e.g., where the vehicle is routed to the event nexus or to a threshold distance of the event nexus). However, the vehicle route can be otherwise dynamically adjusted based on the detected events and/or event parameters.

Dynamically facilitating modification of vehicular operation S500 can additionally or alternatively include determining a notification (e.g., based on a detected event of interest, etc.), which can function to determine whether and what notifications about the event and/or associated aspects should be provided (e.g., to vehicles, vehicle entities, etc.). The notification is preferably generated and/or sent when an event of interest is detected within the monitored geographic regions (e.g., when the vehicle interaction region is anticipated to encompass event location while the detected event is on-going), but the notification can be sent at any other suitable time and frequency.

Figure 20:
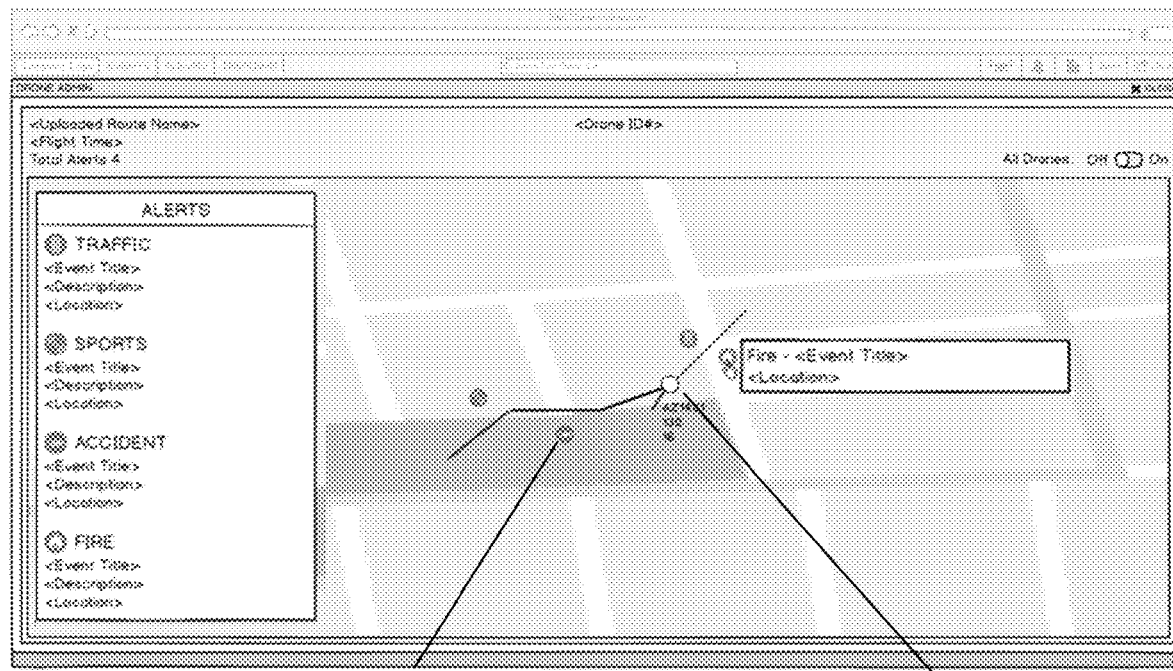
FIG. 20 is a schematic representation of an example of presenting notifications for events proximal the vehicle route.
Figure 21:
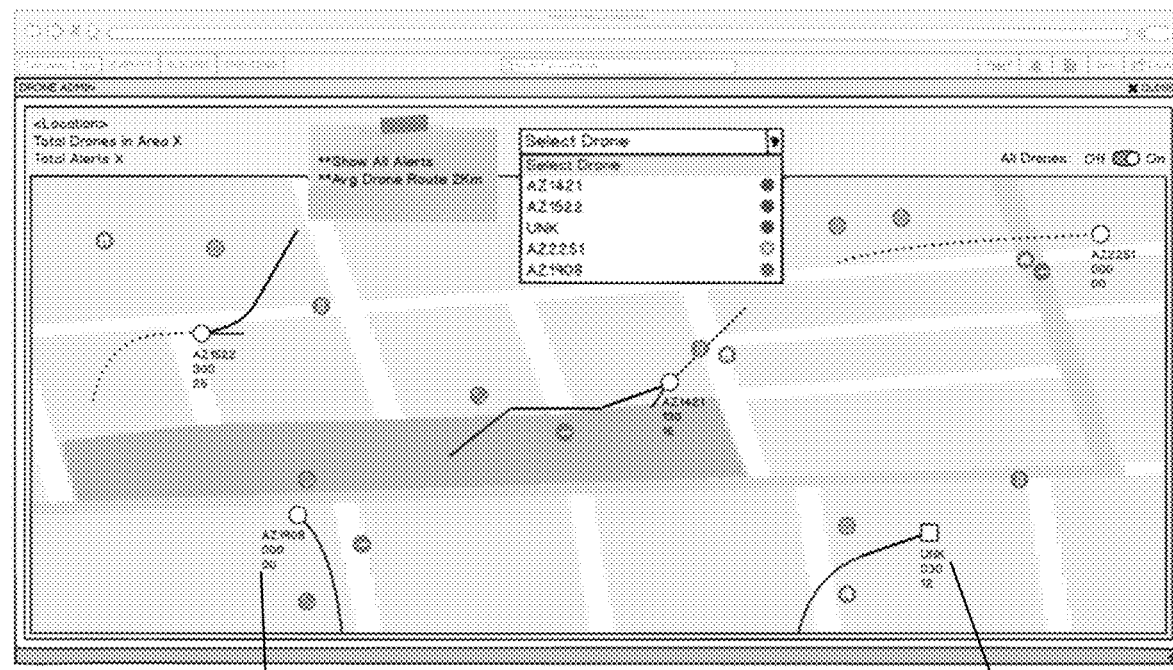
FIG. 21 is a schematic representation of an example of presenting notifications for events proximal vehicle routes for multiple vehicles. of presenting notifications for events proximal the vehicle route.

The notification can include an icon (as shown in examples in FIGS. 20-22), a list (e.g., color-coded; ordered by importance or distance; as shown in examples in FIGS. 20, and 22), a text notification, a programmatic notification, an actionable notification (e.g., where the notification presents one or more action options to the user), operation instructions, or any other suitable components. The notification parameters (e.g., transmission time, size, color, audio, etc.) can be predetermined, determined based on the event's actual or anticipated physical proximity to the vehicle, the event class, the probability of the event affecting the planned route, the type of effect the event will have on vehicle operation (e.g., force route change, will slightly delay), the event's temporal relationship to the vehicle (e.g., probability of terminating by the time the vehicle reaches the event location), and/or otherwise determined. The notification can be generated by the monitoring system and/or any other system, and sent to the deployment system, the vehicle, a user device, or any other suitable system.

Figure 11:
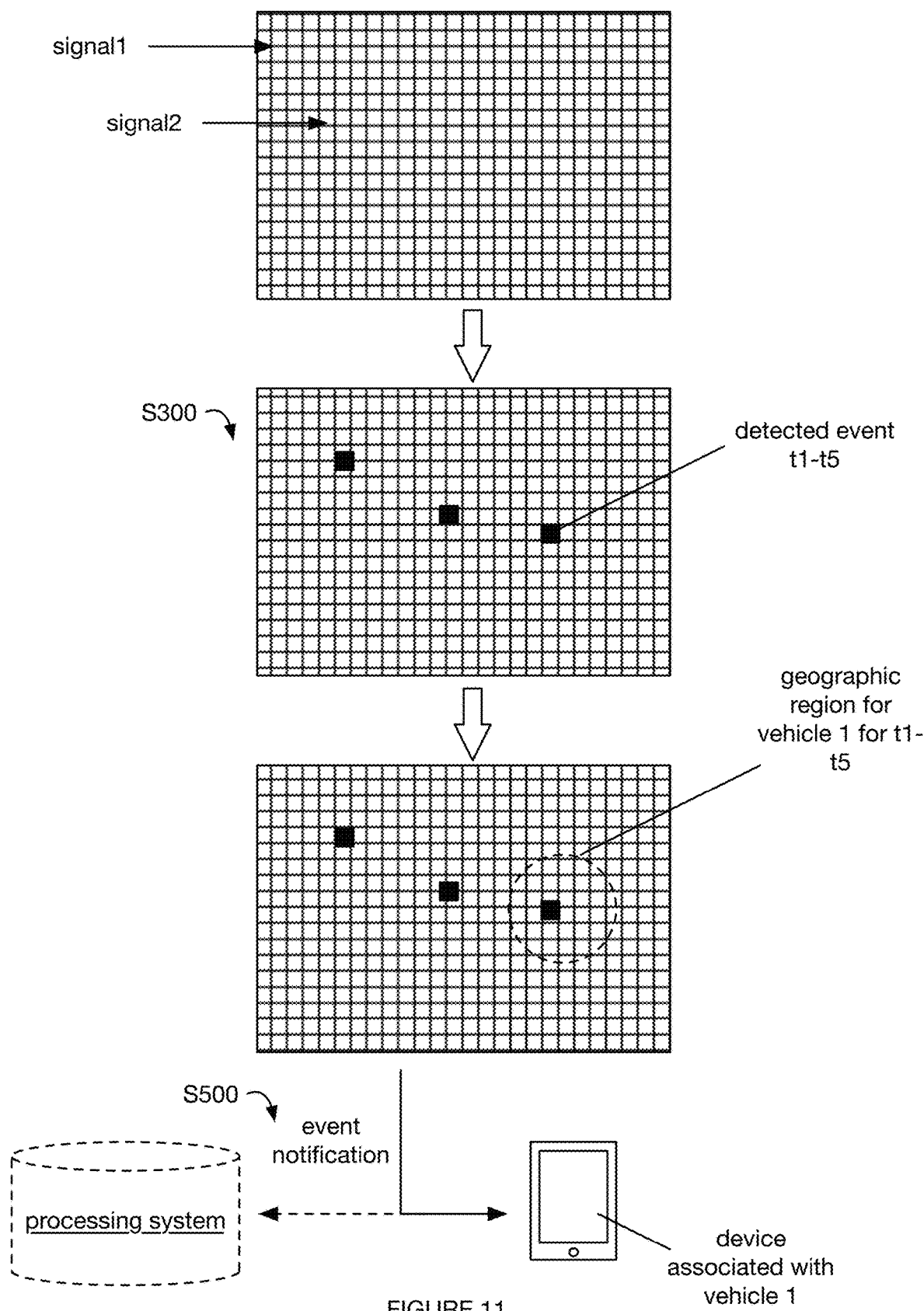
FIG. 11 is a schematic representation of a first variation of monitoring the geographic regions for an event, including monitoring a set of geographic locations, detecting an event in a geographic location, determining that the geographic location is within the geographic region for a vehicle, and notifying the vehicle and/or vehicle entity of the event.
Figure 12:
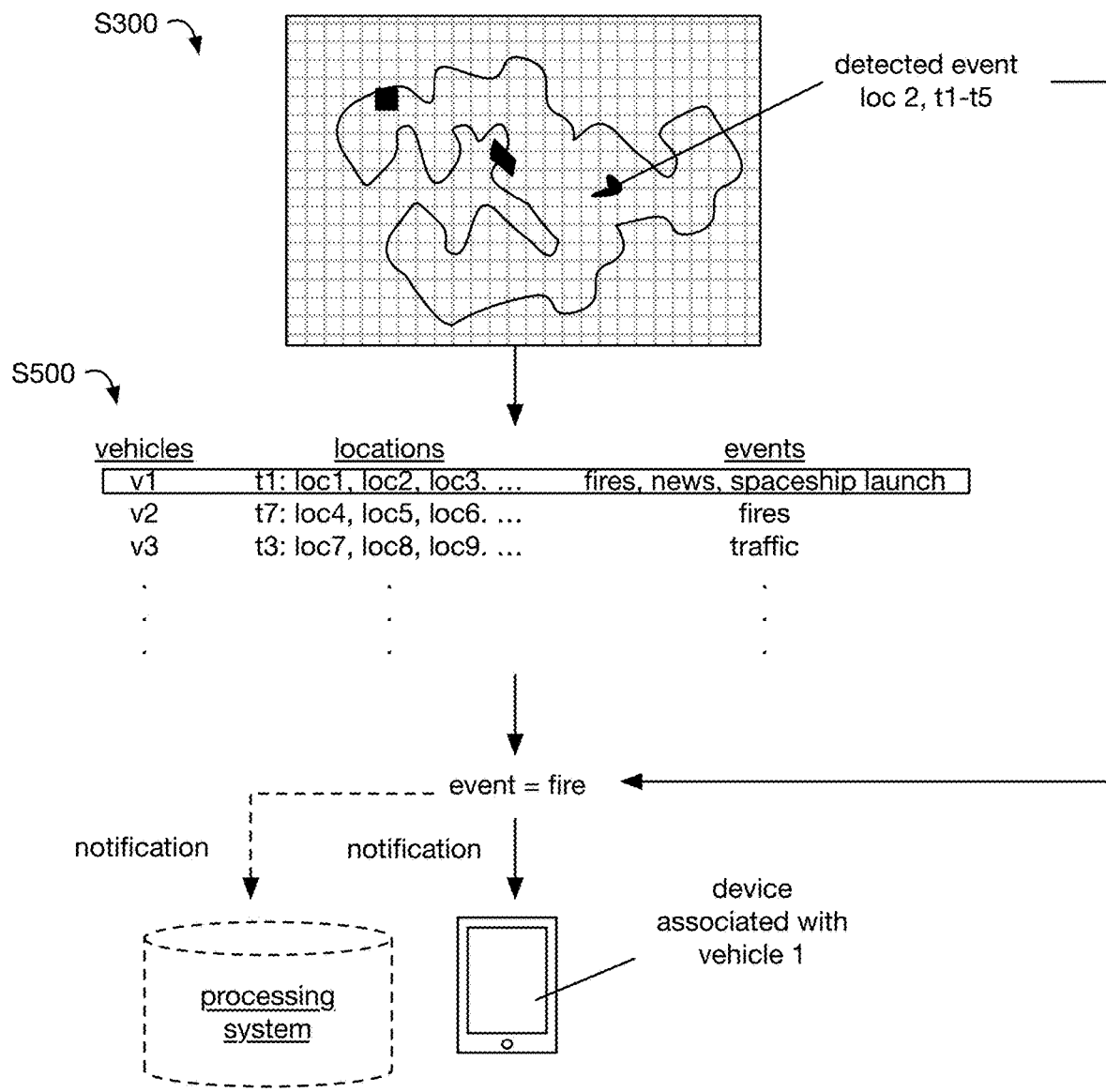
FIG. 12 is a schematic representation of a second variation of monitoring the geographic regions for an event, including detecting events within a set of geographic locations, determining that the geographic location is within the geographic region for a vehicle, determining that the event is of interest to the vehicle and/or vehicle entity, and notifying the vehicle and/or vehicle entity of the event.

In a first variation, determining the notification includes detecting the event in a geographic region (e.g., monitored location), identifying the vehicles associated with the geographic region (e.g., vehicles currently located within the geographic region, vehicles with an interaction region overlapping the geographic region, vehicles with interaction regions that will overlap the geographic region within a threshold period of time, etc.), characterizing the event for a vehicle using modules associated with the identified vehicles, and notifying the vehicle entity (e.g., at a processing system, a user device, an auxiliary vehicle, etc.) when the event satisfies the module conditions (example shown in FIGS. 11 and 12).

In a second variation, determining the notification includes detecting an event in a geographic region; determining whether the event is of interest to a vehicle class (e.g., using a vehicle class module); when the event is of interest to a vehicle class, determining the event location; identifying the vehicles associated with the event location (e.g., within or will be within a predetermined distance of the event location); optionally determining whether the event is of interest to the vehicle (e.g., based on a vehicle or vehicle entity module); and notifying the vehicles and/or vehicle entities of the event (example shown in FIG. 13).

In a third variation, determining the notification includes applying only event-detection methods associated with the vehicle class, vehicle entity, and/or vehicle to the geographic region, such that only relevant events are detected.

Any suitable number and/or type of notifications can be determined and/or provided to any suitable number of entities (e.g., vehicles, vehicle entities, etc.). For example, providing notifications can include: in response to detecting a first vehicle event of interest, determining a first route-related notification (e.g., presenting a graphical indicator of the event of interest at a map displaying the vehicle route, etc.) based on the first vehicle event of interest; in response to detecting the second vehicle event of interest, determining a second route-related notification based on the second vehicle event of interest; and simultaneously presenting the first and second route-related notifications to a vehicle entity associated with the first and second vehicles (e.g., a vehicle entity controlling, managing, and/or otherwise associated with the vehicles, etc.). In another example, the method 100 can include associating the event of interest with a second vehicle based on a second vehicle route for the second vehicle (e.g., identifying that the event is an event of interest to a second vehicle in addition to being an event of interest to a first vehicle, etc.), determining a route-related notification based on the event of interest; and transmitting the route-related notification to a first vehicle entity and a second vehicle entity associated with the first and second vehicles, respectively. However, determining and/or providing notifications can be performed in any suitable manner.

Facilitating modification vehicular operation S500 can additionally or alternatively include providing an event content stream with the notification, which can function to present notifications in a manner adapted for improved viewing (e.g., as shown in an example in FIG. 20). In this variation, the method 100 can include: identifying the signals associated with the detected event, aggregating the signals into an event content stream (e.g., in real- or near-real time) and presenting the event content stream with the notification. The event content stream can optionally be linked to an event icon on a map, where icon selection can open the event content stream. However, providing event content streams can be performed in any suitable manner, and dynamically facilitating modification of vehicular operation S500 can be performed in any suitable manner.

Additionally or alternatively, data described herein (e.g., vehicle routes, geographic regions, vehicle interaction regions, event parameters, modules, external signals, vehicle data, etc.) can be associated with any suitable temporal indicators (e.g., seconds, minutes, hours, days, weeks, etc.) including one or more: temporal indicators indicating when the data was collected (e.g., from a vehicle entity, from external sources, etc.), determined, transmitted, received, and/or otherwise processed; temporal indicators providing context to content described by the data, (e.g., temporal indicators indicating the duration of an event of interest; temporal indicators indicating overlap in time periods between an event of interest duration and a vehicle arrival at a geographic region proximal the event of interest; etc.); changes in temporal indicators (e.g., data over time; change in data; data patterns; data trends; data extrapolation and/or other prediction; etc.); and/or any other suitable indicators related to time.

Additionally or alternatively, parameters, metrics, inputs, outputs, and/or other suitable data can be associated with value types including: scores (e.g., indicating a relevance level of an event to a vehicle and/or vehicle parameter, such as for identifying events of interest; describing a characteristic of an event, such as a danger score; etc.), binary values (e.g., whether or not an event exists, etc.), classifications (e.g., event categories, vehicle classes, geographic region types, etc.), confidence levels (e.g., probability values for detection of an event and/or for event parameter determination, etc.), values along a spectrum, values with any suitable units of measurement (e.g., metric system units, US customary units, etc.), geometric descriptors (e.g., geographic region radius, aggregate region area, event area, route descriptions, etc.), and/or any other suitable types of values. Any suitable types of data described herein can be used as inputs (e.g., for different system components described herein, such as modules; for portions of the method 100; etc.), generated as outputs (e.g., of system components), and/or manipulated in any suitable manner for any suitable components associated with the method 100 and/or system 200.

Additionally or alternatively, components of the system 200 (e.g., modules, event system, monitoring system, vehicles, etc.) and/or suitable portions of the method 100 (e.g., detecting events, determining events of interest, dynamically facilitating vehicular operation modification, etc.) can apply processing techniques including any one or more of extracting features, performing pattern recognition on data, fusing data from multiple sources, combination of values (e.g., averaging values, etc.), compression, performing statistical estimation on data (e.g. ordinary least squares regression, non-negative least squares regression, principal components analysis, ridge regression, etc.), wave modulation, normalization, updating, ranking, weighting, validating, filtering (e.g., for baseline correction, data cropping, etc.), noise reduction, smoothing, filling (e.g., gap filling), aligning, model fitting, binning, windowing, clipping, transformations, mathematical operations (e.g., derivatives, moving averages, summing, subtracting, multiplying, dividing, etc.), data association, multiplexing, demultiplexing, interpolating, extrapolating, clustering, image processing techniques (e.g., image filtering, image transformations, histograms, structural analysis, shape analysis, object tracking, motion analysis, feature detection, object detection, stitching, thresholding, image adjustments, etc.), other signal processing operations, other image processing operations, visualizing, and/or any other suitable processing operations.

Additionally or alternatively, components of the system 200 and/or suitable portions of the method 100 can apply artificial intelligence approaches (e.g., machine learning approaches, etc.) including any one or more of: supervised learning (e.g., using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked auto-encoder method, etc.) reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable artificial intelligence approach.

Embodiments of the system and/or method 100 can include every combination and permutation of the various system components and the various method processes, where one or more instances of the method 100 and/or processes described herein can be performed asynchronously (e.g., sequentially), concurrently (e.g., in parallel), or in any other suitable order by and/or using one or more instances of the systems, elements, and/or entities described herein.

Any of the variants described herein (e.g., embodiments, variations, examples, specific examples, illustrations, etc.) and/or any portion of the variants described herein can be additionally or alternatively combined, excluded, and/or otherwise applied.

The system and method 100 and embodiments thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system comprising:
    a processor; and
    system memory coupled to the processor and storing instructions configured to cause the processor to:
        route a vehicle along a route that defines coordinates of travel in a three-dimensional space;
        while the vehicle is traveling along the route, detect an event based on an external signal including detecting coordinates of the event;
        determine that the event is an event of interest based on a parameter associated with the vehicle; and
        re-route the vehicle toward the coordinates of the event of interest along a shortened route that defines adjusted coordinates of travel in the three-dimensional space, including dynamically modifying operation of a locomotion component to depart from the route to move the vehicle toward the coordinates of the event of interest along the shortened route.

2. The system of claim 1, wherein instructions configured to re-route the vehicle comprise instructions configured to dynamically modify operation of a locomotion component selected from among: a vehicle propulsion component or a vehicle steering component.

3. The system of claim 1, wherein instructions configured to re-route the vehicle comprise instructions configured to:
    determine control instructions for the vehicle based on the shortened route; and
    send the control instructions to the vehicle.

4. The system of claim 1, wherein instructions configured to detect an event comprise instructions configured to:
    collect a plurality of social networking system posts;
    compute a keyword frequency associated with the plurality of social networking system posts; and
    determine that the computed keyword frequency exceeds an historic keyword frequency.

5. The system of claim 1, wherein instructions configured to detect an event comprises instructions configured to detect a ground-based event; and
    wherein instructions configured determine that the event is an event of interest comprise instructions configured to determine that the ground-based event is of interest based on a vehicle parameter received from an airborne Unmanned Aerial Vehicle (UAV).

6. The system of claim 1, wherein instructions configured to route a vehicle comprise instructions configure to route an Unmanned Aerial Vehicle (UAV) along a series of waypoints; and
    wherein instructions configured to re-route the vehicle along the shortened route comprise instructions configured to re-route the UAV along a second different series of waypoints.

7. The system of claim 1, further comprising instructions configured to
    determine an estimated time of arrival (ETA) to the event based on the route; and
    compute vehicle arrival at the event prior to the ETA via travel on the shortened route.

8. The system of claim 1, wherein instructions configured to route a vehicle comprise instructions configure to route an aquatic vehicle along a series of waypoints; and
    wherein instructions configured to re-route the vehicle along the shortened route comprise instructions configured to re-route the aquatic vehicle along a second different series of waypoints.

9. The system of claim 1, further comprising instructions configured to collect sensor data; and
    wherein instructions configured to detect an event comprise instructions configured to detect the event based on the sensor data.

10. The system of claim 1, wherein instructions configured to detect an event comprise instructions configured to determine that an event category probability exceeds a category probability threshold.

11. The system of claim 1, wherein instructions configured to detect an event comprise instructions configured to:
    determine an event category probability based on the external signal;
    compute that the event category probability exceeds a category probability threshold; and
    categorize the event into the event category.

12. The system of claim 1, wherein instructions configured to re-route the vehicle comprise instructions configured to modify a vertical coordinate of travel.

13. The system of claim 1, further comprising instructions configured to identify a region on the route; and wherein instructions configured to detect an event comprise instructions configured to detect an event associated with the region.

14. The system of claim 1, wherein instructions configured to detect an event comprise instructions configured to detect the event using an artificial intelligence approach.

15. The system of claim 1, wherein instructions configured to determine that the event is an event of interest comprise instructions configured to anticipate a physical proximity of the vehicle to the event.

16. The system of claim 1, wherein instructions configured to determine that the event is an event of interest based on a parameter associated with the vehicle comprise instructions configured to determine that the event is an event of interest based on a vehicle parameter selected from among: a vehicle identifier, a vehicle class, a vehicle model, a vehicle component type, a vehicle emission parameter, or a vehicle operation parameter.

17. The system of claim 1, wherein instructions configured to route a vehicle along a route comprise instructions configured to route a fleet vehicle along the route; and
wherein instructions configured to re-route the vehicle comprise instructions configured to re-route the fleet vehicle.

18. The system of claim 1, further comprising instructions configured to ingest the external signal, the external signal selected from among: weather data, emergency response data, flight tracking data, audio data, image data, calendar data, or accident data.

* * * * *